(12) United States Patent
Muller et al.

(10) Patent No.: US 10,204,316 B2
(45) Date of Patent: Feb. 12, 2019

(54) USER GENERATED CONTENT PUBLISHING SYSTEM

(75) Inventors: Sean Muller, Bellevue, WA (US); Richard Rosenblatt, Santa Monica, CA (US); Joey C. Perez, Santa Monica, CA (US); Dennis A. Ameen, Bellevue, WA (US); Larry Fitzgibbon, Santa Monica, CA (US); Greg Griffin, Santa Monica, CA (US); Laurent Gherardi, Bellevue, WA (US); Jon R. Jurgens, Jr., Santa Monica, CA (US); Brian Havener, Bellevue, WA (US); Glenn Moran, Bellevue, WA (US); Dean Busenbark, Bellevue, WA (US); Mark Jones, Bellevue, WA (US); Adam Youngers, Bellevue, WA (US); Ewan Godley, Bellevue, WA (US)

(73) Assignee: LEAF GROUP LTD., Santa Monica, CA (US)

( * ) Notice: Subject to any disclaimer, the term of this patent is extended or adjusted under 35 U.S.C. 154(b) by 2056 days.

(21) Appl. No.: 11/851,243

(22) Filed: Sep. 6, 2007

(65) Prior Publication Data
US 2008/0082381 A1 Apr. 3, 2008

Related U.S. Application Data

(60) Provisional application No. 60/827,403, filed on Sep. 28, 2006.

(51) Int. Cl.
*G06Q 10/10* (2012.01)
*G06Q 10/06* (2012.01)
(Continued)

(52) U.S. Cl.
CPC ............. *G06Q 10/10* (2013.01); *G06F 17/00* (2013.01); *G06Q 10/00* (2013.01); *G06Q 20/145* (2013.01); *G06Q 30/0282* (2013.01)

(58) Field of Classification Search
CPC .... G06Q 30/0282; G06Q 10/10; G06Q 10/00; G06Q 20/145; G06F 17/00
(Continued)

(56) References Cited

U.S. PATENT DOCUMENTS 5,758,088 A 5/1998 Bezaire et al.
5,835,087 A 11/1998 Herz et al.
(Continued)

OTHER PUBLICATIONS www.ehow.com retrieve from www.archive.org any linkage Aug. 11, 2005.*
(Continued)

*Primary Examiner* — Jonathan P Ouellette
(74) *Attorney, Agent, or Firm* — Greenberg Traurig, LLP

(57) ABSTRACT

The invention is directed to a User Publishing System (UPS) that enables both content publishing for users that share what they know in articles and enabling these users to get paid for providing the content through use of a User Compensation System (UCS). The invention enables users to create and edit content in multiple formats, from multiple sources, and in multiple languages. The system can be integrated for use with a plurality of different websites and adopt both the look and feel and the content format of each website, and/or other communication medium. Compensation may be provided to the user providing the content based on a variety of metrics.

20 Claims, 37 Drawing Sheets

(51) Int. Cl.
*G06Q 30/02* (2012.01)
*G06Q 10/00* (2012.01)
*G06Q 10/04* (2012.01)
*G06F 17/00* (2006.01)
*G06Q 20/14* (2012.01)

(58) Field of Classification Search
USPC .................................................. 705/1.1–912
See application file for complete search history.

(56) References Cited

U.S. PATENT DOCUMENTS

| | | | |
|---|---|---|---|
| 5,950,193 | A | 9/1999 | Kulkarni |
| 5,996,006 | A | 11/1999 | Speicher |
| 6,021,433 | A | 2/2000 | Payne et al. |
| 6,029,141 | A | 2/2000 | Bezos et al. |
| 6,112,181 | A | 8/2000 | Shear et al. |
| 6,167,426 | A | 12/2000 | Payne et al. |
| 6,175,831 | B1 | 1/2001 | Weinreich et al. |
| 6,269,369 | B1 | 7/2001 | Robertson |
| 6,327,573 | B1 | 12/2001 | Walker et al. |
| 6,356,879 | B2 | 3/2002 | Aggarwal et al. |
| 6,433,795 | B1 | 8/2002 | MacNaughton et al. |
| 6,449,344 | B1 | 9/2002 | Goldfinger et al. |
| 6,466,917 | B1 | 10/2002 | Goyal et al. |
| 6,571,279 | B1 | 5/2003 | Herz et al. |
| 6,606,657 | B1 | 8/2003 | Zilberstein et al. |
| 6,714,931 | B1 | 3/2004 | Papierniak et al. |
| 6,735,614 | B1 | 5/2004 | Payne et al. |
| 6,745,178 | B1 | 6/2004 | Emens et al. |
| 6,879,994 | B1 | 4/2005 | Matsliach et al. |
| 7,080,124 | B1 | 7/2006 | Shankar |
| 2002/0023132 | A1 | 2/2002 | Tomabene et al. |
| 2002/0023230 | A1 | 2/2002 | Bolnick et al. |
| 2002/0116466 | A1 | 8/2002 | Trevithick et al. |
| 2002/0124053 | A1 | 9/2002 | Adams et al. |
| 2003/0033331 | A1* | 2/2003 | Sena et al. ............... 707/513 |
| 2003/0050977 | A1 | 3/2003 | Puthenkulam et al. |
| 2003/0093285 | A1* | 5/2003 | Colace et al. ............... 705/1 |
| 2003/0167324 | A1 | 9/2003 | Farnham et al. |
| 2003/0187930 | A1* | 10/2003 | Ghaffar et al. ............... 709/205 |
| 2003/0216930 | A1* | 11/2003 | Dunham et al. ................... 705/1 |
| 2003/0225829 | A1 | 12/2003 | Pena et al. |
| 2003/0225834 | A1 | 12/2003 | Lee et al. |
| 2004/0088315 | A1 | 5/2004 | Elder et al. |
| 2004/0088322 | A1 | 5/2004 | Elder et al. |
| 2004/0088325 | A1 | 5/2004 | Elder et al. |
| 2004/0107125 | A1 | 6/2004 | Guheen et al. |
| 2004/0111360 | A1 | 6/2004 | Albanese |
| 2004/0122681 | A1 | 6/2004 | Ruvolo et al. |
| 2004/0122803 | A1 | 6/2004 | Dom et al. |
| 2004/0122855 | A1 | 6/2004 | Ruvolo et al. |
| 2004/0128152 | A1 | 7/2004 | Austin et al. |
| 2004/0143667 | A1* | 7/2004 | Jerome ............... 709/228 |
| 2004/0162830 | A1 | 8/2004 | Shirwadkar et al. |
| 2004/0215793 | A1 | 10/2004 | Ryan et al. |
| 2004/0220881 | A1* | 11/2004 | Powell ............... 705/59 |
| 2005/0125397 | A1* | 6/2005 | Gross et al. ............... 707/3 |
| 2005/0149401 | A1* | 7/2005 | Ratcliffe et al. ............... 705/14 |
| 2005/0256769 | A1* | 11/2005 | Rossides ............... 705/14 |
| 2005/0262204 | A1 | 11/2005 | Szeto et al. |
| 2005/0286546 | A1 | 12/2005 | Bassoli et al. |
| 2007/0005694 | A1 | 1/2007 | Popkin et al. |
| 2007/0112622 | A1* | 5/2007 | Meggs ............... 705/14 |
| 2007/0198510 | A1* | 8/2007 | Ebanks ............... G06Q 30/02 |
| 2007/0250901 | A1* | 10/2007 | McIntire et al. ............... 725/146 |
| 2008/0070209 | A1* | 3/2008 | Zhuang et al. ............... 434/236 |

OTHER PUBLICATIONS www.associatedcontent.com retrieved from archive.org any linkage Dec. 30, 2005.* www.ehow.com additional pages added to main document retrieved any linkage Jun. 4, 2005.*

Supplemental pages retreived via archive.org for Associated content Jul. 17, 2005.*

International Patent Application Serial No. PCT/US2007/80000, Written Opinion, dated Mar. 13, 2008.

* cited by examiner

700

New to eHow?
Show the world what you know!

- Contribute to eHow by writing your own How to's for subjects you are an expert in.
- Save your favorite eHow's
- Collaborate with other eHow users on How to topics that interest you.

[Create a New Account] [1]

Is My Information Safe?
We will protect any information you give us. See our [5] privacy policy.

Sign In to eHow

Username

Password

Forgot your password? [2]

☐ Remember My Username (2) [3]

[Sign In] [4]

*FIG. 7*

Account Info (All fields are required)

Choose a Username*

[1] [Check Availability] [2]

No spaces and it must be unique. Min 4 characters, max 15 characters.

Email Address*

[3]

Please use a real email address as we need to email you to confirm your account.

Choose a Password*    Retype Password*

[4]

Must be at least 6 characters long.

Birthday*

[MM▼] [DD▼] [YYYY▼] [5]

Needed for legal reasons. Only the year is required.

Terms of Use

[ ▲ ]
[ ▼ ] [10]

[9]

☐ I have read and agree to the Terms of Use and Privacy Policy. [6]

[Continue] [7]

[8] Why Register?
• Contribute to eHow by writing your own How To's for subjects you are an expert in.
• Save your favorite eHow's
• Collaborate with other eHow users on How to topics that interest you.
• TBD
• TBD

Is My Information Safe?
We will protect any information you give us. See our privacy policy.

Check Your Email to Complete Registration

We've sent you an email to someemail@aol.com to verify your account. You should recieve the email in the next few minutes. When you do, follow the instructions provided.

While You're Waiting, Customize Your Profile

First Name  Last Name

Gender

ZIP or Postal Code  Country

Email Subscriptions

☐ Article of the day Become an expert at everything by recieving new "How to's" directly to your inbox.

☐ eHow News Read about new and enhanced eHow services, plus get tips on getting the most out of your eHow account.

☐ eHow Offers Recieve special offers and promotions from eHow.

[Save]

Didn't Get the Email?

- First, be patient, sometimes it takes a while for the email to arrive.
- Check above to ensure you entered your email address correctly. If it's wrong, register again.
- Check your junk email box, the message might have been filtered as junk.
- Contact us if you can't get it to work and we'll resend your email.

☐ You are logged in as AdamYoungers79 (My Account | Sign-out)    eHow | weHow weHow
enter text... [ Search ]
○ web ● eHow.com

Help others by sharing
your knowledge!
Sign-Up Now

Home > My Account > Overview

| Overview | Contribute | Manage | My Profile |

1000

Welcome to eHow.com

Use these links to get started:

☐ Write an article
☐ Update your profile
☐ Edit Account Settings

Alerts

| pic | Adam Youngers<br>Seattle, Wa<br>★★★☆☆ |
|---|---|
| | View My Profile    Edit My Profile |

Marketing Content

Recent Drafts

| Date | Title | |
|---|---|---|
| 07/24/06 | How to get laid (Preview) | Edit |
| 07/23/06 | How to write a really really really really really<br>really really long title (Preview) | Edit |

Recent Articles

| Date | Title | |
|---|---|---|
| 07/23/06 | How to Blog Title 2 (View) | Edit |
| 07/05/06 | How to slip and fall (View) | Edit |

Manage All Articles

Recent Comments

| Date | Comment |
|---|---|
| 12/05/06 | Girlygirl on How to fly a jet plane blah blah blah blah blah blah blah blah… (view) |
| 12/14/06 | Adam23 on How to get lost in a public restroom blah blah blah blah blah blah blah blah blah blah blah blah blah… (view) |
| 12/14/06 | SpaceGhost on How to move a house blah blah blah blah blah blah blah blah blah blah blah blah blah… (view) |

View All Comments

Find solutions to your every day problems by searching the weHow Channels    weHow of the Day

- Category Name Here
- Category Name Here
- Category Name Here

- Category Name Here
- Category Name Here
- Category Name Here

- Category Name Here
- Category Name Here
- Category Name Here weHow

- Advertising
- Newsroom
- Contact Us
- RSS eHow Search

[enter text...] [Go]
*Powered by eHow*

Help
- FAQ
- Newsletter
- Membership
- Site Map

Copyright 2004-2006, eHow Inc. Use of this web site constitutes acceptance of the eHow Terms of Use and Privacy Policy

*FIG. 10B*

| Overview | Contribute | Manage | My Profile |

Articles | Readers Comments

Manage Articles

| Date | Title | Rating | Status | | |
|---|---|---|---|---|---|
| 07/23/06 | How to write a really really really really really really really long title (Preview) | N/A | Draft | Edit | Delete |
| 07/23/06 | How to Blog Title 2 (View) | ★★★★☆ | Published | Edit | Delete |
| 07/05/06 | How to slip and fall (View) | ★★★★☆ | Published | Edit | Delete |

Overview | Contribute | Manage | My Profile
Profile Settings | Account Settings

Profile Settings

First Name    Last Name

Display Name [2]
⦿ Username (*Adam564*) [3]
○ First Name/Last Name

Avatar
[Avatar]    Browse

Location    [1]

About Me
B  I  |  ✂ 📋 | ↶ ↷

Enter up to 500 characters

Benefits of adding information

View My Profile

Save My Profile

View My Profile eHow Logo

Username
Real Name

★★★★★
User Rating

PPC Ads?

Paragraph or at least some text about me. Paragraph or at least some text about me. Paragraph or at least some text about me. Paragraph or at least some text about me.

Jons Recent Articles
| Date | Title | Category | Views | Rating |
|---|---|---|---|---|
| 7/31/05 | How to build a tile roof with stuff you... | Home Improv | 4,234 | ★★★★★ |
| 5/01/04 | Fix your shoes with elmers glue. | Sporting goods | 769 | ★★ |

Jons Recent Tips
| Date | Title | Category |
|---|---|---|
| 7/31/05 | How to build a tile roof with stuff you... | Home Improv |
| 5/01/04 | Fix your shoes with elmers glue. | Sporting goods |

Jons Recent Comments
| Date | Title | Category |
|---|---|---|
| 7/31/05 | How to build a tile roof with stuff you... | Home Improv |

*FIG.13*

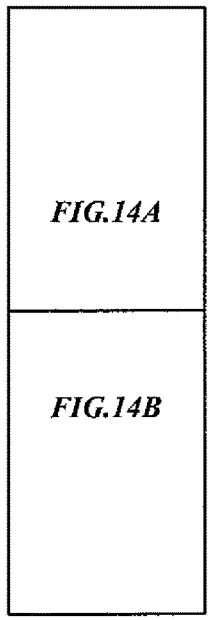

| Overview | Contribute | Manage | My Profile |

Write an eHow article

Title* 9
[How to]

Category* 8
[▼]
Additional categories can be added later.

Keywords* 7
[cats, dogs, animals, blah]
Also commonly reffered to as tags. Add a few words that best describe the article you are about to write.

Quick Links 6
Title
Introduction
Article Body
Conclusion

[Save & Preview]

Introduction
— Introduction Text* —
[enter text...]
Attach Image

— Article Settings —
Additional Categories
[Automotive > Aftermarket Options and Upgrades
    Do-It-Yourself
    Exterior
Automotive > Buying & Selling]
Ctrl+click to select up to 5 articles.

Difficulty Rating  2
[                    ]

[Save & Preview]

FIG. 14B

Article Body

Things You'll Need — 4

* 1/2 Cup Milk
* 5 Apples
* 2 Tbs Butter

Press Enter to add a new item.

Steps — 5

1. enter text...
   Attach Image | Delete Step       *required field 2. enter text...
   Attach Image | Delete Step 3. enter text...
   ☐ Cookie.gif *(Remove)* | Delete Step
   Add a new step

Tips & Warnings — 3

Tips
* Watch for ice.
* Ice can be very slippery.

Press Enter to add a new warning.

Warnings
* Watch for ice.
* Ice can be very slippery.

Press Enter to add a new warning.

[Save & Preview]

Conclusion

Related Articles

Increase your readership by linking related articles below!

~~How to build a swing (3.5 stars)~~
How to fly a kite (4.5 stars)

[Move Up]
[Remove]

Search for Related Articles cat
How to pet a cat (3 stars)
How to declaw a cat (3.5 stars)
How to give a cat a bath (4 stars)
How to get rid of a cat (4.5 stars)

[Add]

Submit a trouble ticket    [Save & Preview] [Save for later] [Publish] — 1

Meade, Celestron, & More
Premier US Meade & Celestron Dealer
25 years of friendly expert service

Meade, Celestron, & More
Premier US Meade & Celestron Dealer
25 years of friendly expert service Ads by Google

Things you'll need:
- nose hair trimmer
- duct tape
- spool of thread
- alligator skin boots

Directions:
1. STEP ONE WILL SHOW UP HERE

Tips & Warnings:
- ♀ Morbi a metus. Phaellus enim erat, vestibulum ve, aliquam a, posuere eu, velit. Nullam sapien sem, ornare ac, nonummy non, tobortis a, enim.
- ⚠ Nunc tincidunt ante vitae massa. Duis ante orci, molestei vitae, vehicula venanatis, tincidunt ac, pede.

Related Articles
- How to do something really stupid
- How to get the CIA to break down your door
- How to spend your life in federal prison

More by this author
- How to do something really stupid
- How to get the CIA to break down your door
- View All By This Author

Recently Viewed
- How to do something really stupid
- How to get the CIA to break down your door
- How to spend your life in federal prison

*FIG.15B*

Sponsored Links
Ads by Google

Meade, Celestron, & More
Premier US Meade & Celestron Dealer 25 years of friendly expert service
www.astronomics.com

Meade, Celestron, & More
Premier US Meade & Celestron Dealer 25 years of friendly expert.
www.astronomics.com

Meade, Celestron, & More
Premier US Meade & Celestron Dealer 25 years of friendly expert.
www.astronomics.com

Meade, Celestron, & More
Premier US Meade & Celestron Dealer 25 years of friendly expert.
www.astronomics.com

Share Your Expertise!
- Reason one for joining weHow.
- Reason two for joining.
- Reason three for joining.
- Learn More Sign Up Now!
Already a member? Sign-In weHow of the Day Get targeted ads on your site with Google AdSense Find solutions to your every day problems by searching the weHow Channels
- Category Name Here
- Category Name Here
- Category Name Here

- Category Name Here
- Category Name Here
- Category Name Here

- Category Name Here
- Category Name Here
- Category Name Here

- FAQ
- Newsletter
- Membership
- Site Map

- Advertising
- Newsroom
- Contact Us
- RSS

Search
enter text... [Search]
○ web ● eHow.com

Help weHow

Copyright 2004-2006, eHow Inc. Use of this web site constitutes acceptance of the eHow Terms of Use and Privacy Policy

*FIG.15C*

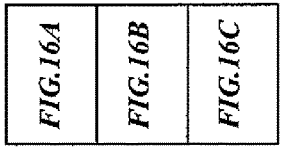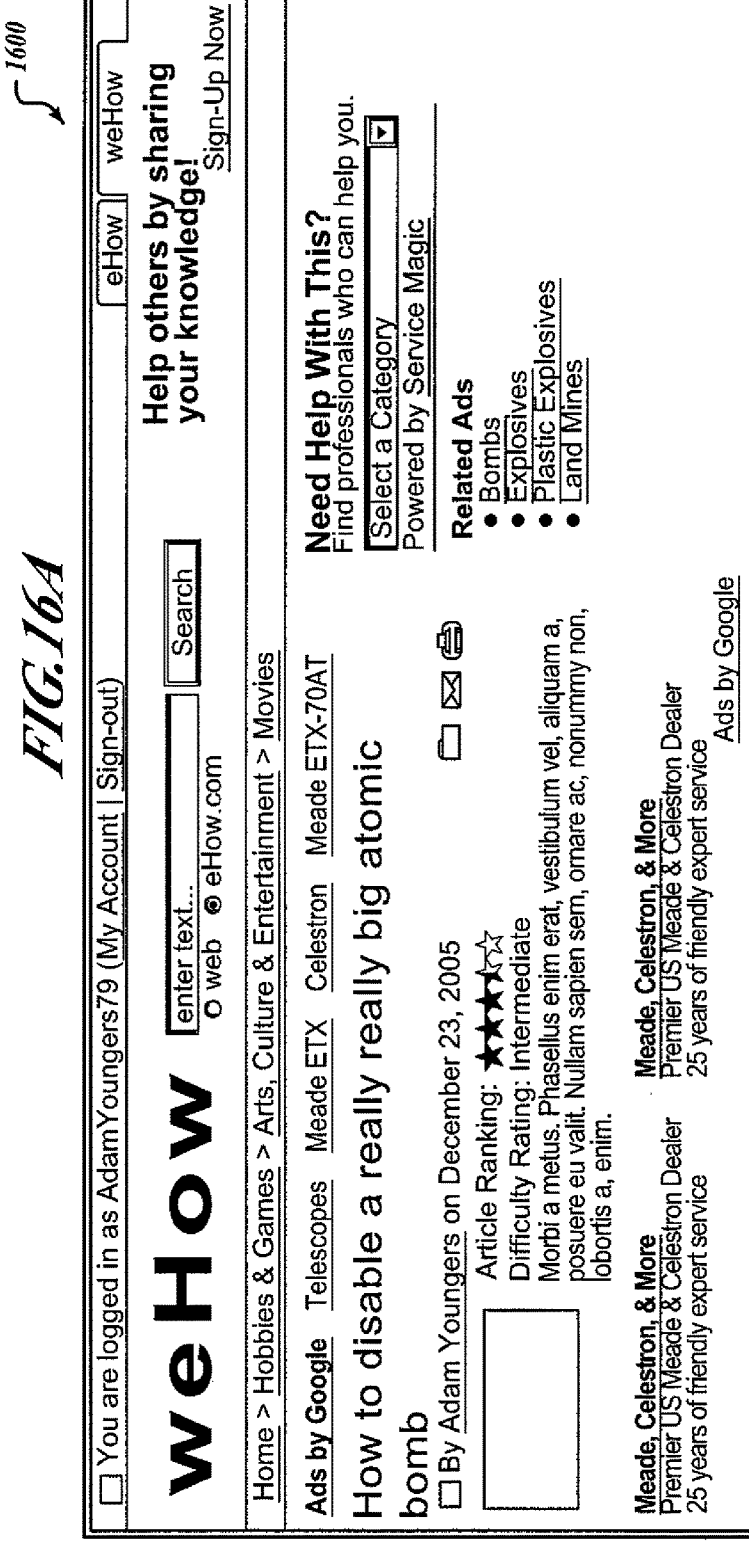

Things you'll need:
- nose hair trimmer
- duct tape
- spool of thread
- alligator skin boots

Directions:

1. Morbi a metus. Phasellus enim erat, vestibulum vel, aliquam a, posuere eu valit. Nullam sapien sem, ornare ac, nonummy non, lobortis a, enim.

2. Nunc tincidunt ante vitae massa. Duis anti orci, molestie vitae, vehicula venenatis, tincidunt ac, pede.

3. Nulla accumsan, elit sit amet varius semper, nulla mauris mollis quam, tempor suscipit diam nulla vel leo. Etiam commodo dui eget wisi.

Tips & Warnings:

Q Morbi a metus. Phasellus enim erat, vestibulum ve, aliquam a, posuere eu, velit. Nullam sapien sem, ornare ac, nonummy non, lobortis a, enim.

⚠ Nunc tincidunt ante vitae massa. Duis ante orci, molestei vitae, vehicula venenatis, tincidunt ac, pede.

Sponsored Links
Ads by Google

Meade, Celestron, & More
Premier US Meade & Celestron Dealer 25 years of friendly expert service
www.astronomics.com

Meade, Celestron, & More
Premier US Meade & Celestron Dealer 25 years of friendly expert.
www.astronomics.com

Related Articles
- How to do something really stupid
- How to get the CIA to break down your door
- How to spend your life in federal prison

More by this author
- How to do something really stupid
- How to get the CIA to break down your door
- How to spend your life in federal prison

Recently Viewed
- How to do something really stupid
- How to get the CIA to break down your door
- How to spend your life in federal prison

Meade, Celestron, & More
Premier US Meade & Celestron Dealer 25 years of friendly expert service
www.astronomics.com Meade, Celestron, & More
Premier US Meade & Celestron Dealer 25 years of friendly expert.
www.astronomics.com Get targeted ads on your site with Google AdSense

Comments by SomeUser234  ★★★★☆
*Legacy Title Here* - Duis ante orci, molestie vitae, vehicula venenatis, tincidunt ac, pede. Nulla accumsan, elit sit.
🚩 Report Abuse ☐ by Adam Youngers on 05/24/06  ★★★★☆
Duis ante orci, molestie vitae, vehicula venenatis, tincidunt ac, pede. Nulla accumsan, elit sit amet varius semper, nulla mauris mollis.
🚩 Report Abuse

◀ ▶

Leave a Comment

[                    ]

[ Submit Comment ]

Share Your Expertise!
- Reason one for joining weHow.
- Reason two for joining.
- Reason three for joining.
- Learn More Sign Up Now!
Already a member? Sign-In

Help us help you!
Please flag with care:
🚩 Flag Article as Offensive

Find solutions to your every day problems by searching the weHow Channels

- Category Name Here
- Category Name Here
- Category Name Here
- Category Name Here

- Category Name Here
- Category Name Here
- Category Name Here
- Category Name Here

- Category Name Here
- Category Name Here
- Category Name Here
- Category Name Here weHow of the Day weHow Here

| Search | Help | weHow | |
|---|---|---|---|
| enter text... [Search] | • FAQ | • Advertising | |
| ○ web ● eHow.com | • Newsletter | • Newsroom | |
| | • Membership | • Contact Us | |
| | • Site Map | • RSS | |

Copyright 2004-2006, eHow Inc. Use of this web site constitutes acceptance of the eHow Terms of Use and Privacy Policy

1700

| eHow Logo | How Do I: [ field ] [GO!] ○ eHow ○ Web |
| | Register | Already a Member, Login |

| Automotive ▽ | Featured Articles: | Everyone's an Expert at Something! |
| Careers/Education ▽ | User Name ★★★★★ Location | Write an Article Today! |
| Computers ▽ | How to Set Up Your Bike for Dirt 📷 ★★★★★ | ① ② ③ |
| Family/Relationships ▽ | Set Up Your Bike for Dirt Jumping Dirt jumping has been around forever... | Learn more about WeHow |
| Finance/Business ▽ | Automotive | 23 Comments | 2399 Reads | Sign Up Today |
| Food/Entertaining ▽ | User Name Location | |
| Health ▽ | How to Get a Reverse Mortgage 📷 | Partner: WikiHow |
| Hobbies/Games ▽ | Get a Reverse Mortgage Reverse mortgages (also called home equity conversion loans) ... | |
| Holidays/Traditions ▽ | Automotive | 23 Comments | 2399 Reads | Featured Profiles |
| Home/Garden ▽ | User Name ★★★★★ Location | Popular | New |
| Personal Care/Style ▽ | How to Build a Deck ★★★★★ | User Name Location |
| Pets ▽ | Build a Deck Building a simple deck means following specific steps, no matter what the design... | User Name Location |
|   Birds | Automotive | 23 Comments | 2399 Reads | User Name Location |
|   Cats | Popular Articles: | |
|   Dogs | How to Build a Deck 📷 ★★★★ | |
|   Farm Animals | Build a Deck Building a simple deck means following specific steps, no matter what the design... | |
|   Fish | Automotive | 23 Comments | 2399 Reads | |
|   Horses | How to Build a Deck ★★★ | Get eHows Daily Tips Via Email > |
|   Small Pets and... | Build a Deck Building a simple deck means following specific steps, no matter what the design... | |
| Sports/Fitness ▽ | Automotive | 23 Comments | 2399 Reads | |
| Travel ▽ | | |

| Popular Categories | Cloud View | | |
| • Auto Insurance | • Harvesting | • Man Hole Covers | • Rusty Nails |
| • Barn Doors | • Internet Hosting | • Neighborhoods | • Stream Fishing |
| • Dogs | • Jungle Gyms | • Optical Lasers | • Trail Riding |
| • Earth Movers | • Kids Clothing | • Police Dogs | • Ultra Violet Rays |
| • Fiber Optics | • Lemon Trees | • Quakes | • Violin Classes |

Home | Site Map | About Us | How To Books | Make Money with WeHow

Set up payout information

Payout account information

PayPal Email Address

We currently offer only PayPal (get a free account...)

We will send payments above $25 to this PayPal email address by the 5th of every month

Tax information

First Name    Last Name

Country of residence
United States

Street Address

City    State or Province

Zip/Postal Code

Telephone number

Social Security Number (Federal ID Number)

We need this information for a US 1099 IRS Form

Submit

Overview | Contribute | My Work | My Earnings | My Profile | Admin

| Overview | Contribute | My Work | My Earnings | My Profile | Admin |

Monthly Statements | By Article | Settings

Congratulations you are now set up to start making money on what you know.

Earnings History

| Period | Status | Earnings | Issue Date | Payment issued |
|--------|--------|----------|------------|----------------|
| Sept 2006 | Completed | $14.96 | Oct 1 2006 | $14.96 |
| Oct 2006 | no payment issued | $6.69 | Nov 1 2006 | $0.00 |
| Nov 2006 | Completed | $24.78 | Dec 1 2006 | $31.47 |
| Dec 2006 | Completed | $56.72 | Jan 2 2007 | $56.72 |
| Jan 2007 | Failed | $87.00 | Feb 1 2007 | $0.00 |
| Feb 2007 | Payment pending | $167.00 | Mar 1 2007 | $227.99 |
| Mar 2007 | Period Active | $133.69 | N/A | N/A |

Total earning s to date: $30.65 note: reverse sorting to show latest first

Earning Summary
Payouts are made by the 5th of each month.

Total To Date: $430.65
Total this month: $34.96

Payment Settings

Account Type: PayPal
Email: Joh@JUrgens.com
Edit settings

*FIG. 20*

| Overview | Contribute | My Work | My Earnings | My Profile | Admin |

Monthly Statements | By Article | Settings

Earnings by Month

November 2006

<< Oct 2006 | Dec 2006 >>

| Title | Category | Published | Earnings |
|---|---|---|---|
| How to build a tile roof with s... | Home Improve... | 05/25/05 | $7.98 |
| Fix your shoes with elmers... | Sporting Good... | 06/30/06 | $11.98 |
| Article Tittle #3 Here | Category Title Here | 06/30/06 | |
| Article Tittle #4 Here | Category Title Here | 06/30/06 | |
| Article Tittle #5 Here | Category Title Here | 06/30/06 | |
| Article Tittle #6 Here | Category Title Here | 06/30/06 | |
| Article Tittle #7 Here | Category Title Here | 06/30/06 | |
| Article Tittle #8 Here | Category Title Here | 06/30/06 | |
| Article Tittle #9 Here | Category Title Here | 06/30/06 | |
| Article Tittle #10 Here | Category Title Here | 06/30/06 | |
| Article Tittle #11 Here | Category Title Here | 06/30/06 | |
| Article Tittle #12 Here | Category Title Here | 06/30/06 | |
| Article Tittle #13 Here | Category Title Here | 06/30/06 | |
| Article Tittle #14 Here | Category Title Here | 06/30/06 | |
| Article Tittle #15 Here | Category Title Here | 06/30/06 | |
| Article Tittle #16 Here | Category Title Here | 06/30/06 | |
| Article Tittle #17 Here | Category Title Here | 06/30/06 | |
| Article Tittle #18 Here | Category Title Here | 06/30/06 | |
| Article Tittle #49 Here | Category Title Here | 06/30/06 | |
| Article Tittle #50 Here | Category Title Here | 06/30/06 | |

<< previous 50 articles | Next 50 articles >>

Total Nov 2006 Earnings for 64 Articles: $31.47

Earning Summary
Payouts are made by the 5th of each month.

Total To Date: $430.65
Total this month: $34.96

Payment Settings
Account Type: PayPal
Email: Joh@JUrgens.com
Edit settings

FIG. 21

| Overview | Contribute | My Work | My Earnings | My Profile | Admin |

Statements | Settings

Payment Settings

You cannot change your payout information while you have a payment pending

Payout account information

PayPal Email Address
ricardo@montalban.com
We currently offer only PayPal

Earning Summary
Payouts are made by the 5th of each month.

Total To Date: $2345.90
Total this month: $34.96

Tax information

First Name    Last Name
Ricardo       Montalban

Country of residence
United States

Street Address
1 Infinite Loop

City            State or Province
Fantasy Island  FL

Zip/Postal Code
12555

Telephone number
999-855-5555

Social Security Number (Federal ID Number)
555-55-5555

Confirm Social Security Number (Federal ID Number)
555-55-5555

Save Changes

FIG. 22

Queues Summary

| Queues | Outstanding | Flags |
|---|---|---|
| Article Queue | 132 | 18 |
| Comments Queue | 230 | |
| Picture Queue | 480 | |

Overview | Contribute | Manage | My Profile | Admin Tools

Alerts

Profile Summary
Username
Location

Edit Profile    Change Password

[Update Your Profile]  [View All Comments]

[Write an Article]

Recent Drafts

Recent Articles

Alerts

Overview | Contribute | Manage | My Profile | Admin Tools

MENU

QUEUES
Article Queue
Comments Queue
Picture Queue

SEARCH

PROMO TOOLS
eHow Home Page
Category Featured Article
weHow Home Page

EHOW OF THE DAY
Present Schedule
Archive Schedules

ALERTS

Comments Queue

Descriptive instructional copy goes here. Descriptive instructional copy goes here. Descriptive instructional copy goes here.

| Remove From List | Delete | Author | Article Title | Submit Date |
|---|---|---|---|---|
| ○ | ○ | Griffster | How to trim your cats nails | 3/23/06 |
| | | Comment text goes here. Comment text goes here. Comment text goes here. Comment text goes here. Comment text goes here. Comment text goes here. Edit | | |
| ○ | ○ | Griffster | How to trim your cats nails | 3/23/06 |
| | | Comment text goes here. Comment text goes here. Comment text goes here. Comment text goes here. Comment text goes here. Comment text goes here. Edit | | |
| ○ | ○ | Griffster | How to trim your cats nails | 3/23/06 |
| | | Comment text goes here. Comment text goes here. Comment text goes here. Comment text goes here. Comment text goes here. Comment text goes here. Edit | | |
| ○ | ○ | Griffster | How to trim your cats nails | 3/23/06 |
| | | Comment text goes here. Comment text goes here. Comment text goes here. Comment text goes here. Comment text goes here. Comment text goes here. Edit | | |

<Previous | Next>

[ Update Status ]

FIG. 26

| | | | | |
|---|---|---|---|---|
| Overview | Contribute | Manage | My Profile | Admin Tools |

Present - eHow of the Day

Descriptive instructional copy goes here. Descriptive instructional copy goes here. Descriptive instructional copy goes here.

MENU

QUEUES
Article Queue
Comments Queue
Picture Queue

| Date | Article # | Article Title | # of EHOD Appeared | Last Date of this EHOD |
|---|---|---|---|---|
| 09/15/06 | 0936 | How to wax your back | 9 | 09/15/05 |
| 09/16/06 | 3265 | How to Decorate a tree with popcorn | 5 | 10/23/06 |
| 09/17/06 | 6985 | How to make a ribbon | 1 | 02/11/06 |
| 09/18/06 | 1478 | How to make a beer bong | 0 | - |
| 09/19/06 | 3257 | How to install a garage door opener | 0 | - |
| 09/20/06 | 0258 | How to build a fort | 0 | - |
| 09/21/06 | 3215 | How to pitch a tent | 0 | - |
| 09/22/06 | 7812 | How to build a bonfire | 3 | 03/16/06 |
| 09/23/06 | 3578 | How to tint your windows | 33 | 01/01/01 |

SEARCH

PROMO TOOLS
eHow Home Page
Category Featured Article
weHow Home Page

EHOW OF THE DAY
Present Schedule
Archive Schedules

ALERTS

<Previous | Next>

*Alerts*

FIG. 30

USER GENERATED CONTENT PUBLISHING SYSTEM

CROSS-REFERENCE TO RELATED APPLICATION

This application is a utility patent application based on a previously filed U.S. Provisional Patent Application Ser. No. 60/827,403 filed on Sep. 28, 2006, the benefit of the filing date of which is hereby claimed under 35 U.S.C. § 119(e) and which is further incorporated herein by reference.

TECHNICAL FIELD

The invention is generally directed to publishing content over a network, and more particularly, but not exclusively, to enabling an author to create content that is usable across different formats, and to receive compensation for such content that is published for online use.

BACKGROUND

Over the last decade, the amount of content available online, such as on the Internet, has grown exponentially. This online content can include text, music, pictures, graphics, cartoons, audio narratives, videos, movies, and the like. In the past, most online content was originally authored for an offline use, such as a magazine, newspaper, radio, television, or the like. Later, this offline content was repurposed by a substantially expensive and manual process into a format(s) and layout(s) that could be published for an online use, such as a website.

Although repurposed offline content is still a significant source for online content, more and more content is being initially created for online use such as websites, Blogs, Real Simple Syndication (RSS) feeds, audio streams, video streams, File Transfer Protocol (FTP) sites, or the like. However, each type of online use often requires content to be arranged in a different format and/or layout than other types of online use. Furthermore, the repurposing of online content for a different online use can still involve a substantially expensive and manual conversion process. Consequently, it can sometimes be expensive and time consuming for an author to create and publish content for different types of online uses. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description Of The Embodiments, which is to be read in association with the accompanying drawings, wherein:

FIG. 7-31 show different screen shots of various embodiments of user interfaces for employing the user publishing system and/or the user compensation system, in accordance with the invention.

DETAILED DESCRIPTION OF THE EMBODIMENTS

Figure 1:
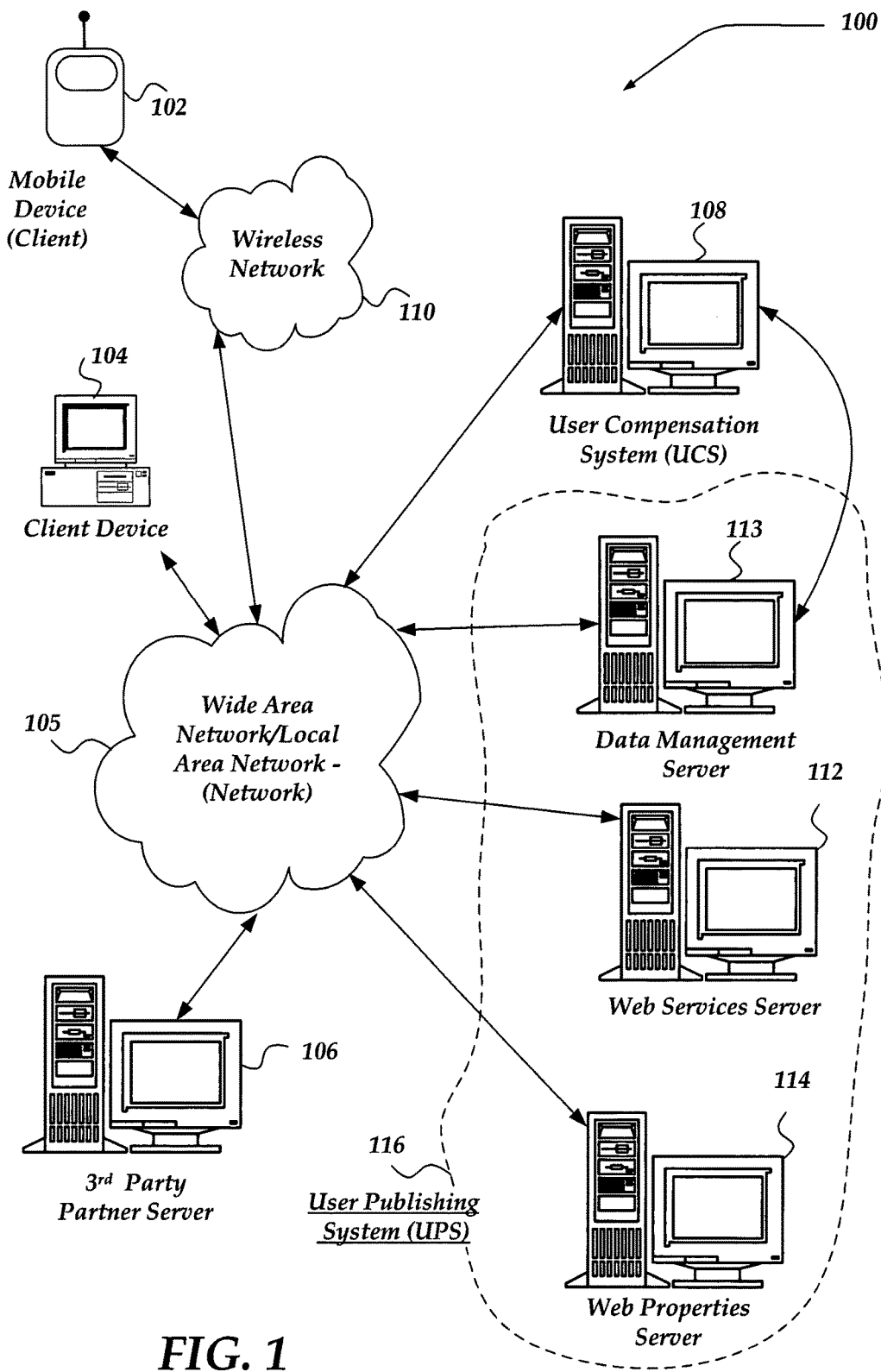
FIG. 1 is a system diagram of one embodiment of an environment in which the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Moreover, the present invention makes use of the following terms, acronyms, and abbreviations for describing the User Publishing System (UPS), and User Compensation System (UCS):

"P" content refers to professional content produced by UPS staff and/or third party content providers. "I" content refers to content produced by individual end users who may not invite collaboration into their work. "C" content refers to content produced by one or more end users, typically working asynchronously. In one embodiment, "C" content may initially arise as "P" content.

Generally, content refers to virtually any material that may be provided for use within an internet website, including, but not limited to text, music, pictures, graphics, cartoons, audio narratives, videos, movies, or the like. Additionally, in one or more embodiments, the content can further include articles and/or images. For example, the content can also include videos, pictures, logos, illustrations, animations, music, audio recordings, source code, pseudo code, messages, emails, alerts, instant messages, or virtually any other type of content that can be digitally represented. Moreover, content may be considered to be independent of its format. Thus, content may include any of a variety of formats, including, without limit, image files, video files, audio files, documents, database files, spreadsheets, Hyper-Text Markup Language (HTML) files, or the like. Content may also be classified as user generated content "UGC."

Various entities may perform actions, or assume particular roles. While typically, an entity may assume a single role, the invention is not so constrained, and an entity may also assume a plurality of roles or personae. Thus, within the present invention, a "writer" may include virtually any contract or otherwise relatively permanent employee of a UPS staff. The writer may assume a primary role of production of "P" articles for website products, or the like.

The term "editor" refers to those entities whose primary role is typically associated with pushing P articles through various editorial workflows described the UPS. The terms "administrator," or "admin" refer to those entities whose primary role includes establishing the editorial workflows and/or creating accounts, and managing the architecture for the UPS for use by editors and/or writers. The terms "end-user," and "user" refer to those entities that may register for use of the UPS, and typically provide "I" and/or "C" content. While an entity typically represents a person, the invention is not so limited. Thus, an entity may include virtually any person, group of persons, businesses, organizations, or even a computing structure including a program, or the like.

Briefly stated, the invention is directed to providing a system, method, and devices that enable a user to publish content for online use and to receive compensation for such actions. The user may be enabled to edit content in one or more different formats, layouts, languages, or the like. The edited content subsequently may be automatically arranged for publication on one or more online resources, such as websites, blogs, Real Simple Syndication (RSS) feeds, within various streaming content formats or sources, or the like. This automatic arrangement can entail changing a portion, or more, of the edited content into another format, layout, language, or the like, that is suitable for publication on each online resource. In one embodiment, the content is originally authored by the user, while in another embodiment the content is provided by one or more other online resources for editing by the user for online use.

Additionally, since content published on a website can attract large audiences, subsequent viewing of a published article can also generate revenue or any other form of compensation with click-through on related advertisements, affiliates, e-commerce, lead generation, and other business methods. This user behavior can generate significant revenue or other compensation for the publisher of the content; and even for a website owner.

In one embodiment, the invention may comprise at least two components, a User Publishing System (UPS), and a User Compensation System (UCS). The UPS allows users to publish their own content on one or more websites, while the UCS determines and enables a user to receive a share of the revenue or other compensation that their content generates through the use of the UPS. In one embodiment, the UCS may be implemented as a separate component, even on a distinct computing device; however, the UCS may also be implemented as a component integrated within the UPS, or within a same computing device.

In one embodiment, the UCS may determine compensation based on click-through actions, a number of times a user's page is viewed, feedback from others about the user' page (such as through impressions), a mouse over by a viewer of the page over such as advertisements on the user's page, over portions of a defined content, or the like. The invention is not limited to these mechanisms for determining compensation, however, and virtually any other mechanism may also be employed to provide revenue or other compensation to a user, and/or website owners, and to encourage the user to continue to provide content through use of the UPS.

As a user's popularity increases through use of the UPS, the user may be enabled to influence which advertisements might be shown in conjunction with their content. Thus, in one embodiment, the UPS may enable a UPS user to become known in a particular subject, and to build up their credibility on a topic, in part, by writing a variety of different articles, providing content, or the like. Via an automated feedback system, UPS can be used to rank the quality of each article (or other content) and also the overall expertise and credibility of the writer. As a writer using the UPS gains credibility, social networking components may enable the writer to brand themselves and to connect with like-minded writers and an interested audience.

In one embodiment, the UPS also provides a suite of tools that enable several administrative and editorial features as described below. The UPS also provides tools for the user community and to internal editorial staff to ensure that informative, useful content is being published.

The UPS employs a variety of algorithms to maintain the integrity of the system. For example, one or more fraud algorithms are provided to ensure that content generated by users is not fraudulently used to generate revenue or other compensation by either the content's author or third parties. There is also a mechanism for determining the value of an article, and in turn the royalty payment to the user. This mechanism combines, amongst other factors, the popularity of the content, its quality, as well as the value its readers draw to an advertiser. Additional algorithms are in place to detect "junk" content as well as assess the quality of a writer. A user rating system can provide feedback on content and this rating can be employed by itself or with other factors to determine the content's value to other users and quality.

In one embodiment, the invention can be integrated for use with particular online resources, so that the arrangement of the published content automatically adopts the "look and feel" of content published on the online resource.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, mobile device (client device) 102, client device 104, third party partner server 106, User Compensation System (UCS) 108, and User Publishing System (UPS) 116. UPS 116 further includes Data Management Server 113, Web Services Server 112, and Web Properties Server 114.

One embodiment of a client device is described in more detail below in conjunction with FIG. 2. Generally, however, mobile device 102 is one example of a client device that is portable, and may include virtually any portable computing device capable of receiving and sending a message over a network, such as network 105, wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. As such, mobile device 102 typically ranges widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message.

Mobile device 102 also may include at least one other client application that is configured to receive content from another computing device. The client application may include a capability to provide and receive textual content, multimedia information, or the like. The client application may further provide information that identifies itself, including a type, capability, name, or the like. In one embodiment, mobile device 102 may uniquely identify themselves through any of a variety of mechanisms, including a phone number, Mobile Identification Number (MIN), an electronic serial number (ESN), network address (such as an IP address, port number, and/or the like), or other device identifier. The information may also indicate a content format that the mobile device is enabled to employ. Such information may be provided in a message, or the like, sent to client device 104, UPS 116, or other computing devices.

Mobile device 102 may also be configured to communicate a message, such as through Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Mobile device 102 may further be configured to include a client application that enables the end-user to log into an end-user account that may be managed by another computing device, such as UPS 116. Such end-user account, for example, may be configured to enable the end-user to receive emails, send/receive IM messages, SMS messages, RSS feeds, to access selected web pages, create and/or publish content, receive compensation, feedback, or the like.

Client device 104 may include virtually any computing device capable of communicating over a network to send and receive information, including email messages, IM messages, SMS messages, RSS feeds, or the like. Furthermore, client device 104 may be configured to enable a user to create and/or publish content including articles for publication to a website, to receive comments or other feedback associated with the content and/or to receive compensation based in part on the content, advertisements associated with the content, or the like.

The set of such devices may include devices that typically connect using a wired communications medium such as personal computers, multiprocessor systems, microprocessor-based or programmable consumer electronics, network PCs, or the like. Similarly, client device 104 may include one or more applications as described above in conjunction with mobile device 102.

Wireless network 110 is configured to couple mobile device 102 and its components with network 105. Wireless network 110 may include any of a variety of wireless sub-networks that may further overlay stand-alone ad-hoc networks, or the like, to provide an infrastructure-oriented connection for mobile device 102. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for mobile devices, such as mobile device 102 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), or the like. In essence, wireless network 110 may include virtually any wireless communication mechanism by which information may travel between mobile devices 102-104 and another computing device, network, or the like.

Network 105 is configured to couple UPS 116 and/or UCS 108 with other computing devices, including, client device 104, and through wireless network 110 to mobile device 102. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between MSS 106, client device 104, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of UPS 116 is described in more detail below in conjunction with FIGS. 4-6. Briefly, however, UPS 116 includes one or more network devices configured to enable content publishing for users to share content over a network with others. When UPS 116 is combined with UCS 108, the user may receive a reward for providing the content. Thus, as shown, UCS 108 may include virtually any computing device configured to determine and provide compensation to a user that employs UPS 116 to manage and publish content.

As shown in FIG. 1, UPS 116 includes a Data Management Server 113 that is configured to provide data storage and analytics for content, feedback to the content, reporting services, and/or revenue analysis. Data Management Server 113 may also include data about the user, including, but not limited to login, password, region information, preferences, or the like. Data Management Server 113 may communicate with UCS 108 to enable data to be accessed to determine compensation for a user of UPS 116.

Web Services 112 is configured to provide various web services to a user including various search tools, user interfaces, accounting tools, registration services, security services, or the like, that enable a user to access, edit, and/or otherwise publish, or maintain content useable for a website.

Web Properties Server 114 is configured to enable display and/or management of one of more websites. In one embodiment, Web Properties Server 114 may provide access to websites that enable retrieval of content for display. In one embodiment, Web Properties Server 114 may include one or more websites controlled or otherwise managed for providing of professional content. Such content may be written in multiple languages and configured to execute on a variety of different computing platforms, and/or configurations. In one embodiment, automatic reformatting of the content may be performed to enable the content to be available through a variety of different communication mechanisms, including, but not limited to web pages, IM, RSS feeds, emails, or the like.

Thus, while Web Properties Server 114 is illustrated as a single computing device, the invention is not so limited. For example, Web Properties Server 114 may represent a plurality of different computing devices. Similarly, Web Services Server 112, and/or Data Management Server 113 may also represent a plurality of computing devices, rather than a single computing device. Therefore, devices that may operate as components of UPS 116 include personal computers desktop computers, multiprocessor systems, microprocessor-based or programmable consumer electronics, network PCs, servers, network appliances, or the like.

3rd Party Partner Server 106 represents virtually any computing device configured to provide a plurality of third party services, including website content, advertisement content, or the like. In one embodiment, UCS 108 may be provided within 3rd Party Partner Server 106, to provide revenue and/or other compensation to the UPS 116 based on different mechanisms, including pay per clicks for advertisements, or the like. In one embodiment, 3rd Party Partner Server 106 may provide the advertisement content, or the like, and then receive information from UCS 108 indicating how much compensation to provide, based on reports provided by UCS 108, or the like. Devices that may operate as components of 3rd Party Partner Server 106 include personal computers desktop computers, multiprocessor systems, microprocessor-based or programmable consumer electronics, network PCs, servers, network appliances, or the like.

Illustrative Client Device

Figure 2:
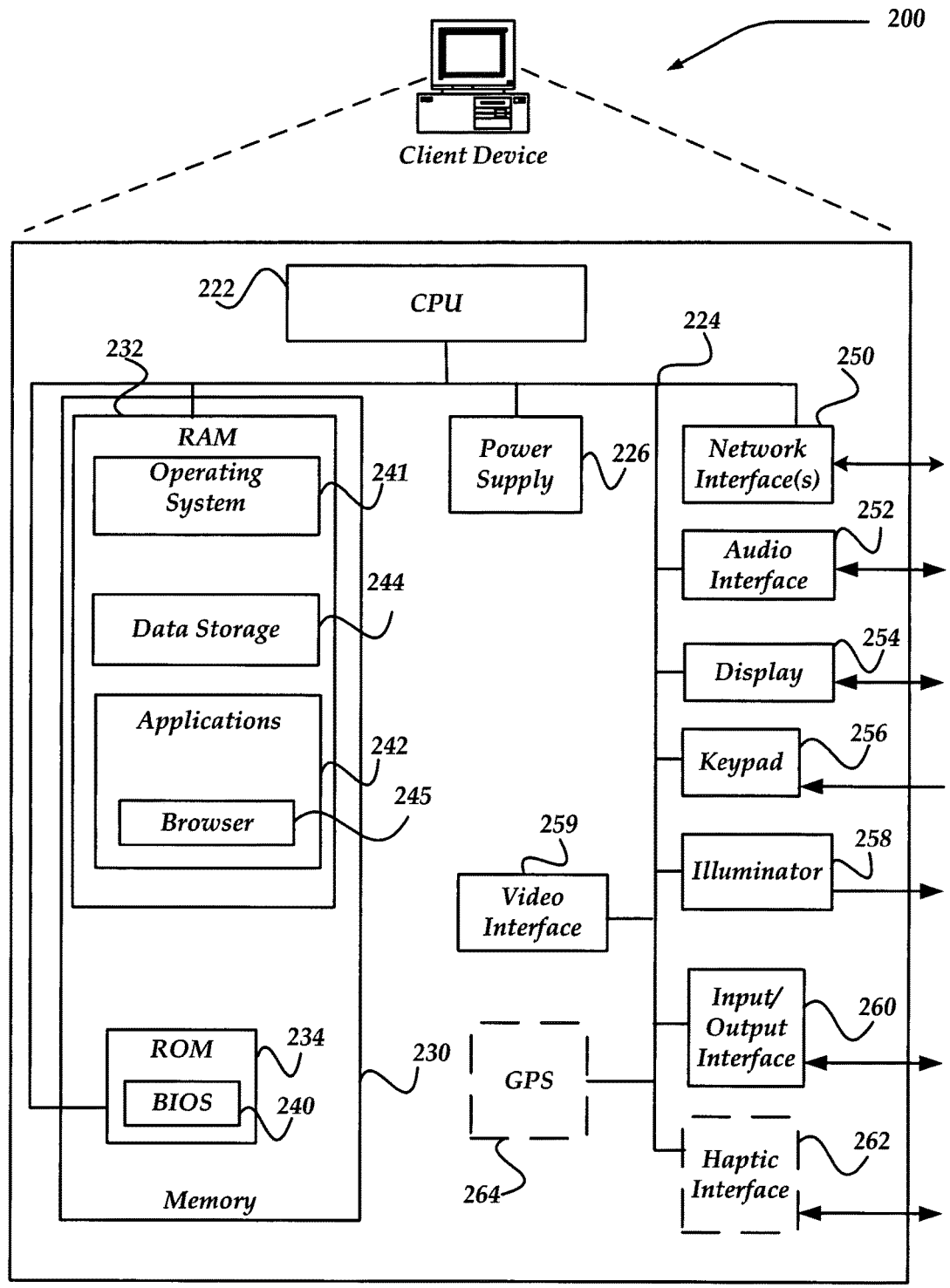
FIG. 2 shows a schematic diagram of one embodiment of a client device useable to interact within the environment of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, client devices 102 or 104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, an optional haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Optional haptic interface 262 is arranged to provide tactile feedback to a user of the client device. For example, the optional haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like. Moreover, data storage 244 may also be employed to store multimedia information and/or content for later publication, editing, or the like, as well as other information including address lists, contact lists, personal preferences, or the like. At least a portion of the content may also be stored on a disk drive or other storage medium (not shown) within client device 200.

Applications 242 may include computer executable instructions which, when executed by client device 200, transmit, receive, and/or otherwise process messages (e.g., SMS, MMS, IM, email, and/or other messages), content, and enable telecommunication with another user of another client device. Other examples of application programs include calendars, editors, email clients, IM applications, SMS applications, VOIP applications, contact managers, task managers, transcoders, database programs, word processing programs, security applications, spreadsheet programs, games, search programs, and so forth. Applications 242 may further include browser 245. Browser 245 may include virtually any of a variety of client applications configured to receive and/or provide communications of web pages, and other content over a network. Browser 245 typically provides for a graphical display of various web pages, including user interfaces provided, in part, by another computing device over the network. Browser 245 may include a variety of security features, and/or other plug-in applications, modules, applets, scripts, or the like, to enable display of animation, videos, playing of audio files, or the like. Browser 245 and applications 242 are configured to enable a user to prepare content for publication to UPS 116 of FIG. 1. Moreover, through one or more of applications 242, the user may receive notification of and/or compensation for their contributed content.

Illustrative Server Environment

Figure 3:
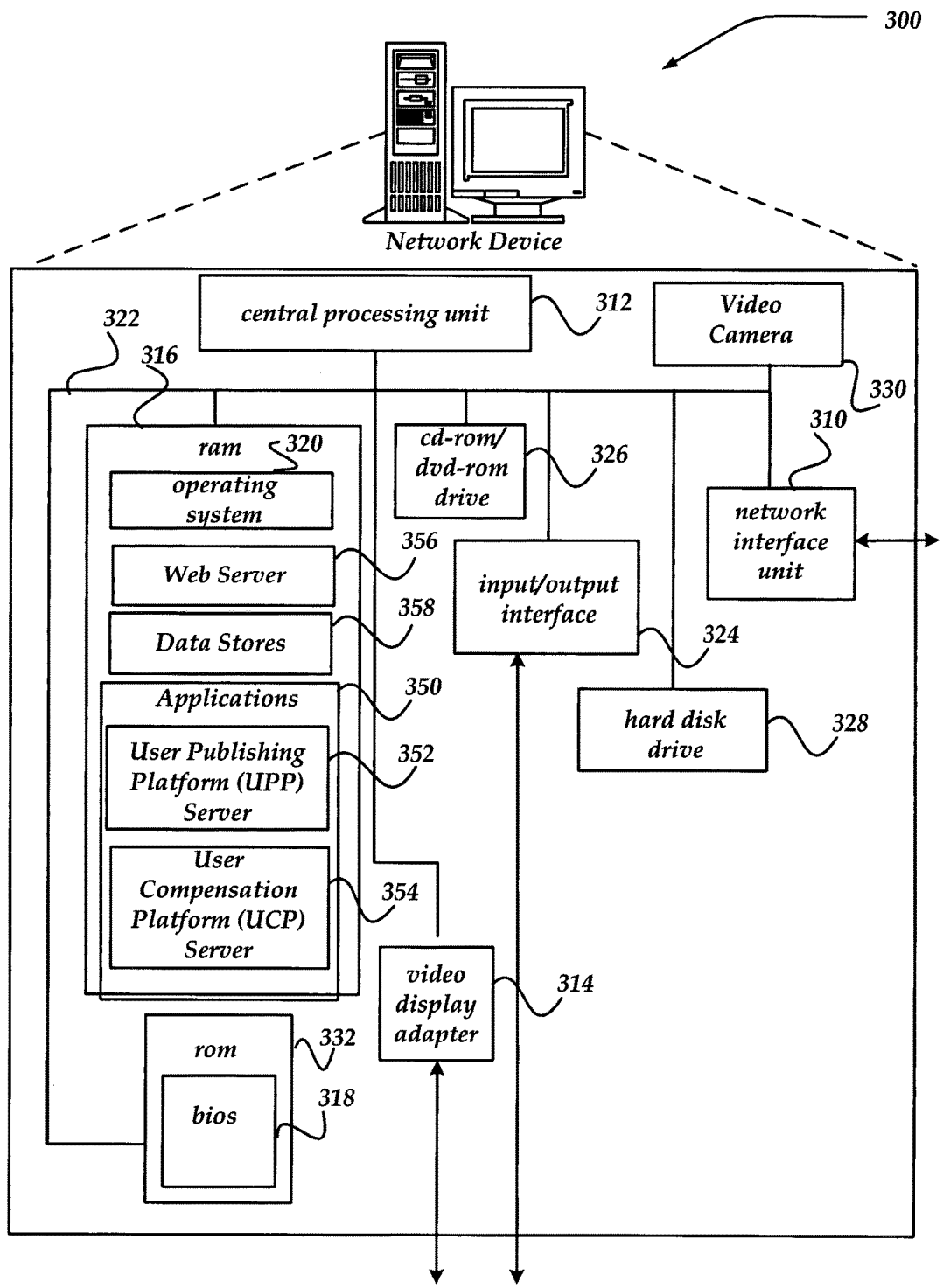
FIG. 3 illustrates a schematic diagram of one embodiment of a network device useable within the environment of FIG. 1.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, an integrated User Publishing System (UPS) and User Compensation System (UCS). Thus, in one embodiment, network device 300 may represent an integrated device for managing UPS 116 and UCS 108 of FIG. 1. However, it should be clear from above, that such components also may be distributed across a plurality of different computing devices. Thus, FIG. 3 should not be construed as constraining or limiting the invention in any manner, but instead is intended as merely one of a variety of possible implementations.

In any event, network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, SMS message servers, IM message servers, email servers, account managers, and so forth.

Mass memory further includes web server 356, data stores 358, and applications 350. Applications 350 are shown to include User Publishing Platform (UPP) server 352 and User Compensation Platform (UCP) server 354. Web server 356 includes virtually any application configured to delivers Web pages and other content to browsers and other client applications via at least the HTTP protocol. However, web server 356 may also be configured to provide scripts, user interfaces, accounting interfaces, editors, security, or the like, to the client application. Moreover, web server 356 may employ a variety of other communication protocols, beyond HTTP. For example, web server 356 may be configured to manage email communication protocols, SMS protocols, IM protocols, or the like. Moreover web server 356 may employ a variety of scripts, applets, programs, or the like, to enable communications of content with a client application. In one embodiment, web server 356 may represent, in part, web properties services provided through Web Properties Server 114 of FIG. 1 and described in more detail below in conjunction with FIG. 4. In one embodiment, web server 356 may also obtain the content and/or user interfaces, applications, or the like, from data stores 358.

Data stores 358 may include any of a variety of storage mechanisms, configured to store, and otherwise managed content, applications, scripts, applets, or the like. As such, data stores 358 may be a database, a file structure, or the like. Data stores 358 may store the content into a category structure, such as folders, albums, graphs, trees, or the like, based on a user account, a web service, or the like. In one embodiment, data stores 358 may represent the Data Management services illustrated in FIG. 1, and described in more detail below in conjunction with FIG. 4.

UPP 352 is described in more detail below in conjunction with FIG. 4. Briefly, however, UPP 352 includes a variety of components to provide web services to a user, including search tools, user interfaces, plug-and-play modules, or the like. Various embodiments of example user interface screens are described in more detail below.

UCP 354 is described in more detail below. Briefly, however, UCP 354 includes applications, and/or data configured to determine compensation for content provided by a user, based on a variety of mechanisms, including but not limited to impressions of the content by others, click-through activities of a viewer of the content, mouse overs by a viewer on a webpage including the content, or the like. Embodiments of various user interface screens are described in more detail below.

Illustrative Overview UPS Platform Architecture

Figure 4:
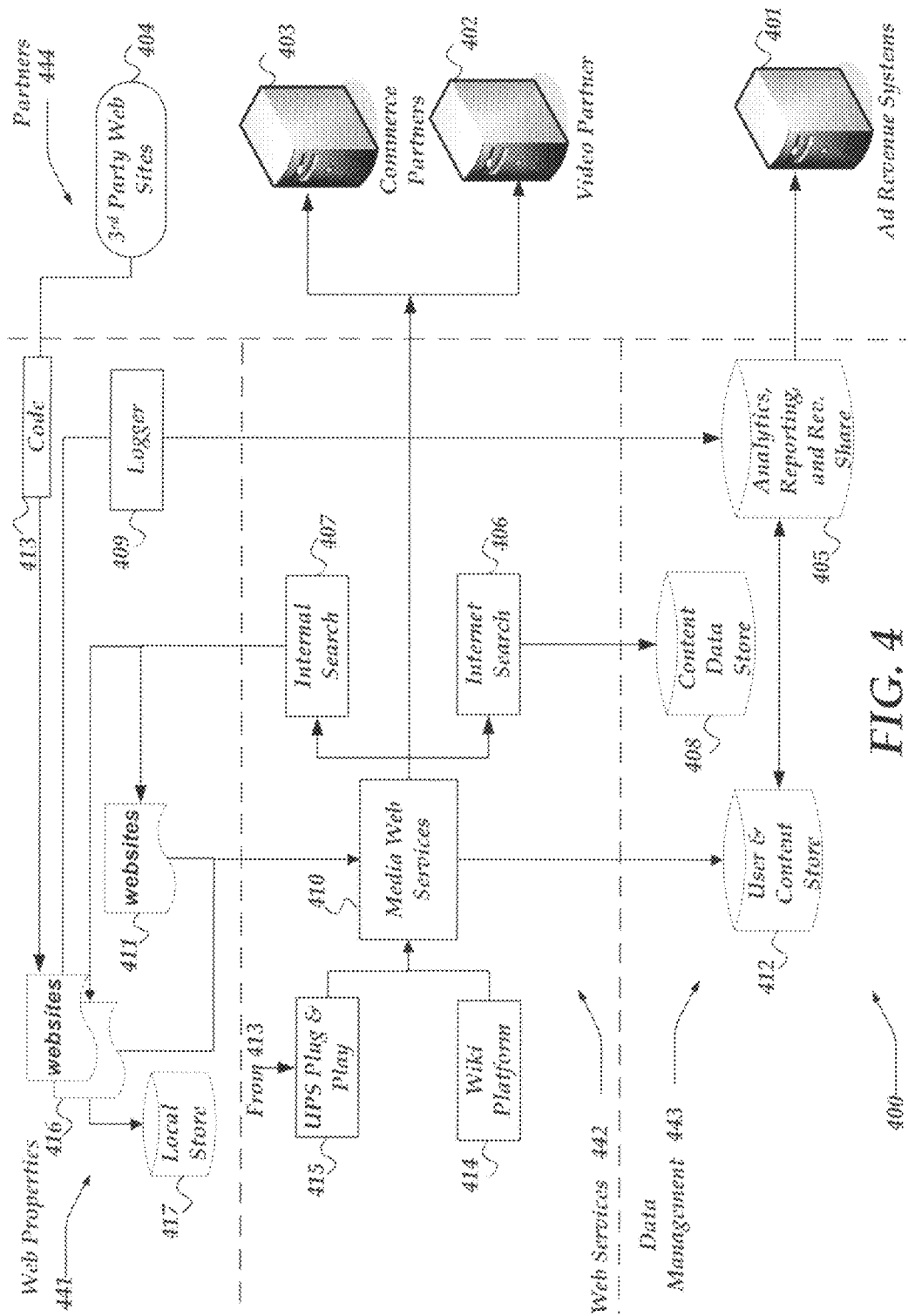
FIG. 4 shows an overview diagram of one embodiment of a user publishing platform of the environment of FIG. 1.

FIG. 4 shows an overview diagram of one embodiment of a user publishing platform for the environment of FIG. 1. As such, FIG. 4 provides an expanded illustration of UPS 116 and third party Partner server 106 of FIG. 1. UPP Architecture 400 may include many more components than those shown. The components shown, however, are sufficient to disclose an illustrative embodiment for practicing the invention.

As shown, UPP Architecture 400 includes web properties 441, which represents one embodiment of an expansion of Web Properties Server 114's architecture. UPP Architecture 400 also includes web services 442, which represents one embodiment of an expansion of Web Services Server 112's architecture. UPP Architecture 400 further includes Data Management 443, which represents one embodiment of an expansion of Data Management Server 113 of FIG. 1. Moreover, as shown, UPP Architecture 400 also includes Partners 444, which represents one embodiment of an expansion of 3rd Party Partner Server 106 of FIG. 1. In one embodiment, Web Properties 441, Web Services 442, and Data Management 443 represent UPS 116 of FIG. 1.

As illustrated, Partners 444 may include Ad revenue systems 401, video partner 402, commerce partners 403, and/or 3rd party web sites 404. However, Partners 444 is not constrained to include only these types of partner servers/services, and others may be included, without departing from the scope of the invention. Ad revenue systems 401, for example, may represent virtually any computing system configured to include third party advertisements, advertisement revenues, or other services that may provide and/or other compensation to UPS 116 based on different mechanisms, including, but not limited to a number of advertisements displayed, pay per click (PPC), cost per thousand (CPM), cost per lead (CPL), cost per action for an advertisement (CPA), mouse over costs, impression fees, or the like. UPS 116, and its illustrated components in FIG. 4, may communicate with AD revenue systems 401 using a variety of different protocols, including, but not limited to FTP, HTTP, SOAP, or the like. In one embodiment, information provided by Ad revenue systems 401 may be obtained, and/or provided to UPS 116 through Analytics, reporting and Revenue Share data store 405.

Video partner 402 represents commerce partners that are in communication with the media web services application 410 via one or more protocols, including, but not limited to, 3rd party APIs, FTP, HTTP, SOAP, or the like. Through video partner 402, the web service application 410 may expose a plurality of e-commerce functions that can be used across multiple websites. It should be noted, that the invention is not limited to video partners, and other content partners may also be includes, including audio partners, graphical partners, or the like.

Commerce partners 403 include a 3rd party Video upload partner, as well as other commerce providers. For example, video streaming, search capability, advertisements, additional content, or the like, can also be provided by commerce partners 403 for user generated videos, audio files, content, or the like. The media web services application 410 is similarly in communication with commerce partners 403, which can enable a user to upload and/or encode videos, audios, or the like, while storing the metadata in, for example, user & content store 412. This metadata can include a variety of information, including, identity of user(s), or the like, that uploaded the content, information about the content, rights, licenses, or the like.

3rd party websites includes 3rd party websites that are not necessarily controlled by an operator, or the like, of UPS 116, but which may be enabled to use at least some of its features.

As shown, Data Management 443 includes Analytics, Reporting and Rev Sharing (ARRS) data store 405, Content data store 408, and user & content store 412.

ARRS 405 represents any storage mechanism that enables storage reporting, and related analytics. In one embodiment, ARRS 405 may include a database, a spreadsheet, program and data, or the like. In one embodiment, ARRS 405 is part of the data management layer of the UPS 116 and can be arranged to run OLAP, or the like, and to provide reporting services. ARRS 405 may also be arranged to store detailed logs from defined websites and overlay the logs with revenue data and/or other compensation data that is retrieved from 3rd party advertisement revenue systems. The ARRS 405 can be used for reporting, accounting, and revenue share and/or other compensation sharing of websites, and/or other 3rd party websites. Thus, in one embodiment, at least a portion of ARRS 405 may be employed to provide at least some data, or other support to UCS 108 of FIG. 1.

Content data store 408 includes a local database, spreadsheet, file, program, or the like. Content retrieved, for example, by internet search 406 may be stored content data store 408. The content can be exposed via an internal web application, script, applet, API, or the like, which can be used by a search mechanism to index or otherwise access the stored content.

User & content store 412 includes a database, file, spreadsheet, program, or the like, for storing information, such as professional content (for some properties), individual and collaborative content, as well as user tips and comments, or the like. In at least one embodiment, the content can be stored in XML. However, the invention is not so constrained, and the content may also be stored in any of a variety of formats. User & content store 412 can also store user account information, user security information, user profile data, or the like, and provide for retrieval of revenue and/or other compensation specific information from the ARRS 405.

Web services 442 include UPS Plug-and-play 415, wiki platform 414, media web services 410, and internet searches 406-407.

Internet search 406 includes an external search appliance, crawler application, and/or spider application, or the like that crawls one or more external network sites to find different types of content. The located content may be stored locally in a database and/or made available for use by users through Media web services 410. In one embodiment, internet search 406 may be used to supplement content that is generated by users. For example, a user searching for "how to bake a cake," can get results not just from UPS 116, but also from external sites that may include how-to's on the topic (e.g. cooking.com), and/or similar topics.

Internet search 407 includes an internal search appliance, crawler application, and/or spider application, or the like, that crawls and indexes one or more network sites to find different types of content, e.g., "how to" content, or the like, on websites that may be controlled by the UPS 116. The content may be stored locally in a database and made available via the Media web services 410. Internet search 407 may further allow users to search through the content generated by and residing in UPS 116.

Media web services 410 is arranged to include article retrieval, tip/comment retrieval and submission, user registration and login, article creation, article edits and wiki functions, e-commerce products, internal searches, content searches across the web, or the like. Thus, in one embodiment media web services 410 is configured to provide user interface screens to enable a user to register for and use the invention to create and publish content. In one embodiment, media web services 410 provides the user interfaces such as those described in more detail below. Moreover, in one embodiment, media web services 410 can enable caching of content and other information for fast retrieval by a user, administrator, or the like.

Wiki platform 414 includes a wiki type platform to enable collaborative development of web content. In one embodiment, wiki platform 414 may operate substantially similar to the wiki media open source platform. In one embodiment, wiki platform 414 may provide editing, and/or formatting tools, version control tools, or the like, as well as rules, procedures, policies, security, or the like, for its use. In one embodiment, wiki platform 414 may be included within UPS plug-and-play 415. In one embodiment, a user may access wiki platform 414 though media web services 410.

UPS plug-and-play 415 provides a series of forms, scripts, applets, or the like. In one embodiment, the forms can be embedded in a client application, interface, or the like, such as through javascript, iFRAME, or as a hosted ASP application. UPS plug-and-play 415 can communicate with the media web services 410 using SOAP, or virtually any other protocol, to enable its functions, including user registration and login, or content creation. This layer of the system can maintain forms used to submit different content formats. It can also act as a central management server to manage logins across different websites.

Web properties 441 include websites 411 and 416, logger 409, and code 413. Logger 409 includes virtually any mechanism configured to enable a website to log viewing traffic and/or clicks, mouse-overs, feedback, or the like. The logging may, in one embodiment, be continuously written to cache and/or periodically written as XML, or the like, to disk. In one embodiment, a separate service may access the logs from disk and write them to a logging database, such as ARRS 405, or the like.

Websites 411 represents websites that employs UPS 116 to enable retrieval of content and to perform related UPS functions via communication with the media web services 410. In one embodiment, plug and play code may be employed by websites 411 to manage user logins, and/or related account services. Websites 411 can also be used for generating new content and enabling users to edit existing content collaboratively using various tools and user interfaces provided by web services 442.

One embodiment of code 413 includes client side javascript code configured to enable "injection" of forms, or the like, into a client's website. In one embodiment, code 413 may perform such injections using one or more mechanisms, including, for example, iFRAME. Code 413 may be further configured to enable management of user logins, sessions, and/or content creation. Once code 413 is injected or otherwise provided to the website, the user can customize parameters associated with its use. Use of code 413 may then provide the user with access to user interface screens, such as those described below, for use in managing content through the UPS, and/or managing compensation through the UCS. In one embodiment, the UPS may be configured using an Application Service Provider (ASP), or the like, where the publishing of various content may then be hosted on, for example, a 3rd level domain name and/or configured to hosts a user Interface of the client's website. In one embodiment, a user session may be maintained between the client website and the UPS though use of cookies. However, the invention is not so constrained, and other mechanisms may also be employed. Moreover, in one embodiment, the communication between the user and the UPS and/or UCS interfaces may be over a secure network connection, using for example, SS/TLS, or other secure tunneling protocols.

Websites 416 include those websites that may be managed or otherwise controlled by the operators, administrators, or the like, for the UPS. In one embodiment, website 416 may include a local data store 417. Local data store 417 may be employed, for example, to store and/or manage professional content that may be written in multiple languages for use in running on a plurality of different platforms. In one embodiment, websites 416 may be able to access media web services 410 to retrieve individual and collaborative content. Websites 416 may also access for use other components within web services 442, including for example, the UPS plug-and-play 415 to manage user logins, profiles, and/or to create new articles or other content, and/or to comment on existing content.

User Compensation System (UCS)

The UCS is directed towards employing various metrics obtained, in part, from activities on or for a website managed through UPS, to determine compensation for users that provide content to the managed websites. As discussed above, the UCS may be implemented as an integral component to the UPS, of as a separate component. Thus, in one embodiment, the UCS may be implemented as illustrated in FIG. 1. In another embodiment, the UCS may be configured as a component, such as UCP 354 within an integrated network device, such as illustrated in FIG. 3. In any event, the UCS may provide a wide variety of interfaces useable for managing compensation to other websites. However, in at least one embodiment, the UCS may be configured to inhibit a user from viewing a rolled up version of accrued revenue and/or other compensation across a plurality of managed websites. In such an instance, a user might have to check earning status at each of the managed websites for which the user contributes content. However, in another embodiment, the UCS may enable the user to obtain rolled up accrued revenue and/or other compensation across the plurality of managed websites for which the user contributes content.

In one embodiment, the UCS may provide a "rev share" revenue and/or other compensation model available for "I" users, where the user might be paid based, in part, on a percentage of advertisement click-throughs. For example, in one embodiment, the rev share may be determined based on the following calculation:

$$\Sigma CID([Rev]/[Adjusted\ Clicks])\times[Rev\ Share]$$

for a give article or other content ID over a period, and where CID represents a unique ad unit, such as PPC ads, CPM ads, lead generation ads, affiliate ads, video ads, or the like, on a given article or content page. In one embodiment, the calculation can sum revenue and/or other compensation and clicks on an advertisement unit based where click value varies between units. Moreover, the calculation may be configured to adjust itself for advertisements paid on different models, such as the above examples. In the above calculation, "Rev" refers to revenue and/or other compensation generated per a subcategory of a webpage, content, article, or grouping of articles, or the like. In addition, "Adjusted Clicks" refers to clicks recorded per article page. In one embodiment, the clicks may be summed at a subcategory level. Adjusted clicks may also include, in another embodiment, various other detectable actions, including such as mouse overs by a viewer of an advertisement, impressions, or the like.

In the above calculation, rev share may be a percentage determined through a tiered structure for revenue and/or other compensation share percentage. Such tiered structure is not limited to any particular arrangement. However, one example of a tiered structure might be configured based on various drivers, including a frequency, based on published articles over a period for a given user; or page views that may represent a total number of page views for a given article or other content ID over a period of time. Such metrics may be obtained, for example, through logger 413 of FIG. 4. In any event, a rev share pay rate may be determined for each user based on a same basis, or on a weighted basis based on various other measures, inputs, factors, or the like. In one embodiment, a UPS and/or UCS administrator, or the like, may be enabled to modify a rev share percentage based on various factors, including, for example, a tier structure, independent of a calculated value, or based on input from other sources.

Payouts to a user may, in one embodiment, accrue until a pre-defined minimum amount is reached. Such amount may be virtually any value, ranging from amounts within fractions of cents to amounts in the dollars. In one embodiment, when the minimum amount is reached for the user, the payout amount may be transferred to the user through a variety of mechanisms. In one embodiment, the payout may be provided electronically, using such as a Paypal account, or the like. However, other mechanisms, such as a check, credit to a bank account, or the like, may also be used. In one embodiment, payouts may also be provided based on a time period. Thus, in one embodiment, if a user is to receive a payout, such amount may be provided to the based on a specified time during a month, quarter, year, or the like. In one embodiment, the user may also be notified and/or modify when and/or how a payout is provided. In one embodiment, the payout may be configured to without various deductions, including taxes, or the like. In one embodiment, the UCS may even be configured to process various tax forms, such as 1099 forms, or the like.

Where a payout to a user fails to properly occur, the UCS may be configured to provide auditing, and/or other tracing tools configured to determine a source of the failure, including whether a user incorrectly configures a payout account, or the like. Moreover, information may be made available to assist the user in reasonably correcting user oriented failures.

As described above, payout determinations may be based on a variety of factors, events, or the like. In one embodiment, a click may be defined, therefore, as being based on virtually any defined payable event. Such payable events, include, but are not limited to a user clicking on a defined Pay Per Click (PPC) advertisement, mousing over a payable advertisement, selecting a webpage with a payable advertisement in view, providing a generated lead, an impression on a cost per thousand impressions (CPM) advertisements, or the like.

To ensure that a specific content provider does not abuse the pay model, such as by attempting to generate false/excessive clicks, a network address associated with the content provider may be obtained when the provider logs in. Such network address may be stored and monitored for changes. The network address may include a device identifier, an IP address, or the like. The network address can be compared against click traffic to determine if the content provider is generating false clicks. Where a content provider might be behind a proxy server, network address translation service, or the like, additional analysis may be performed to determine the source of the clicks. For example, in one embodiment, cookies may be employed.

In one embodiment, it may be considered reasonable that a visitor to an article or other content may have one or more advertisement clicks during their session. It might be considered, however, unreasonable for an article reader to have excessive clicks during their session on a given article or other webpage. Analytics may be done to determine what the acceptable range is for Ad clicks on a given article and what range is excessive. In one embodiment, 0-2 clicks may be a relatively reasonable number and thus a pay out can occur for each. Also, a reasonable range might be 0-5 clicks where payout can occur for up to 2 of the total clicks. However, in another embodiment, more than 5 clicks on a given article may be considered excessive and may indicate fraudulent activity. It should be noted, however, that the invention is not constrained to these values, and others may also be used, without departing from the scope of the invention. If this excessive click behavior is detected then no payout may occur for any of the clicks that occurred during that session for the specific article. In addition the IP address of the visitor may be flagged and analyzed for future potential exclusion from further click payout consideration.

Moreover, it may be considered reasonable that, in one embodiment, a visitor to a webpage managed using UPS, to have between zero to about 5 or so clicks, during a session. Such data may be tuned, based on logged data, or other sources. In any event, such a situation might indicate that one or more articles may be consumed and various advertisement clicks being executed on such articles, or other content, such that upwards of about 5 clicks might occur during the visitor's session. If the visitor generates a defined excessive number of clicks, such as twice the expected number (e.g., 10 clicks during the session, or the like), than such behavior might indicate fraudulent behavior. If such fraudulent behavior is identified, such as exceeding the defined 10 click per session threshold, in one embodiment, payout might be inhibited to the content provider for that website during the visitor's session. In one embodiment, a network address may be determined for the visitor suspected of such fraudulent behavior. In one embodiment, the visitor might be warned, excluded from future payouts if is associated with the content provider, or the like.

It is recognized that many of today's browser client applications are configured to accept cookies for a duration of a user's session on a given website. If cookies are 'turned off' then cookies may not be saved at the end of the session but instead may either be rejected or deleted by the browser. If an Advertisement click event is logged and there is no cookie associated with it for the session, in one embodiment, such click event might be considered suspect and further analyzed for validity. However, in another embodiment, a defined number of non-cookies identified click events may be allowed per article or other content per session or per hour. In one embodiment, such non-cookie related click events may be honored and paid. However, in another embodiment, if an article or other content receives an excessive number of non-cookie identified click events per session or per hour, further analytics may be performed to determine fraud. Where fraud is determined, no click events for that session might be paid.

Generalized Operation

The operation of certain aspects of the invention will now be described with respect to FIG. 5. FIG. 5 illustrates a flow chart of an overview of process 500 for the user publishing platform with user compensation. Process 500 may be implemented within a single computing device, such as described above in conjunction with FIG. 3. Process 500 may also be distributed across a plurality of computing devices, such as described in conjunction with FIG. 1, above.

Figure 5:
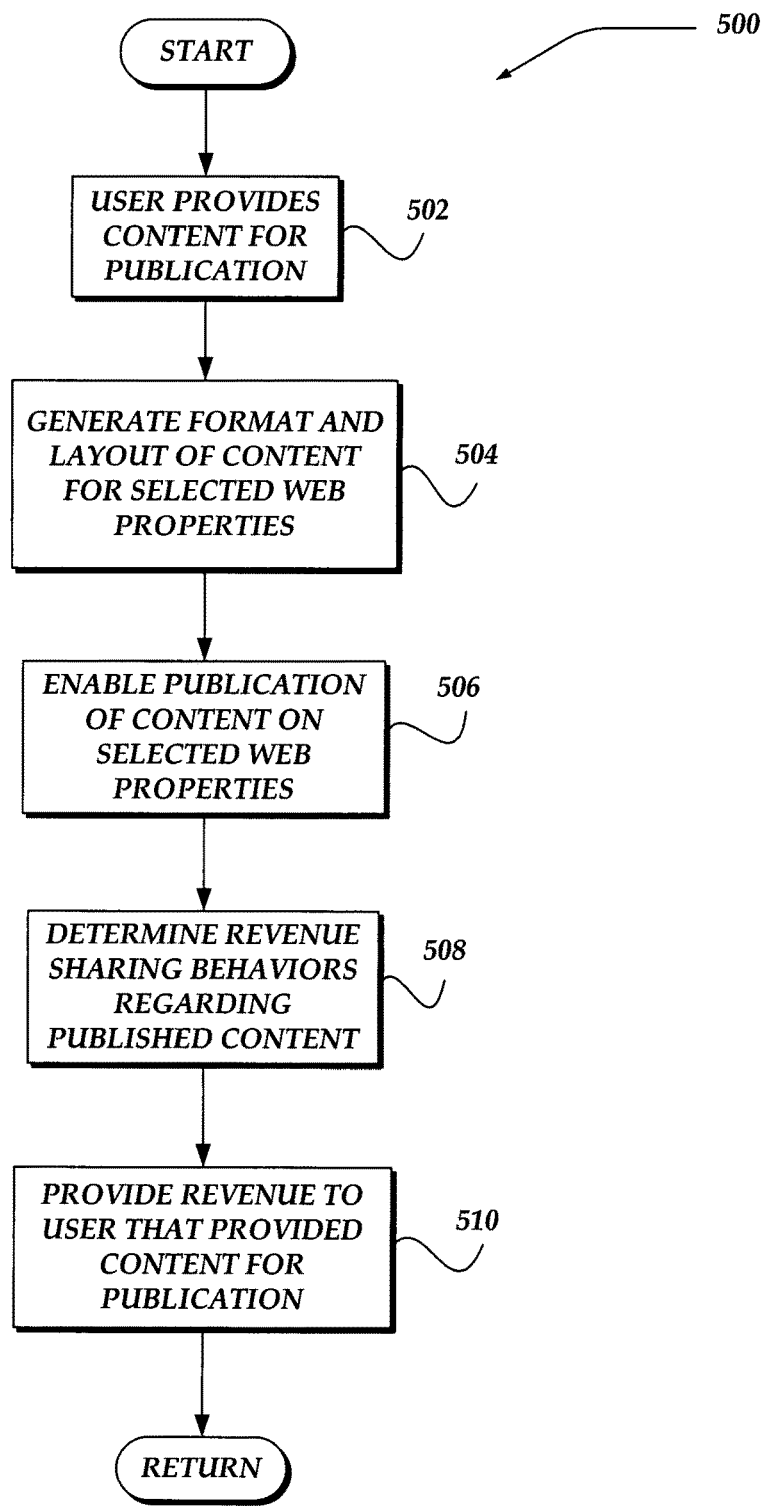
FIG. 5 illustrates a flow chart of an overview of a process for the user publishing platform.

In any event, process 500 of FIG. 5, may begin, after a start block, where a user (content provider) provides content for publication. In one embodiment, the user may initially interact with various user interfaces to the UPS to access scripts, tools, applets, or the like, for use in creating, editing, and otherwise managing content for publication. In one embodiment, the user may initially perform a registration as described in conjunction with the user interface screens below.

The user may then provide content to the UPS using such additional screen interfaces, applications, or the like, provided by UPS. In one embodiment, the user may provide the content using a variety of different formats, using a variety of different computing languages, or the like.

Processing then flows to block 504, where the UPS may restructure the received content into a variety of other formats, layouts, or the like, suitable for use by a variety of mechanisms. For example, the UPS may reformat some of the received content for use with RSS feeds, email delivery, IM delivery, SMS delivery, or the like. The UPS may also reformat some of the received content for use in viewing within a mobile device's browser format, or a desktop browser, or the like. Thus, the UPS may reformat the received content for a plurality of different delivery/viewing mechanisms. In one embodiment, the UPS may convert at least some of the received content into an XML format, mobile format, or the like. Moreover, the UPS may modify the content to fit various website layouts, conforming to a variety of different viewing mediums, or the like. In one embodiment, the UPS may change font types, font sizes, colors, resolutions, or the like, as well.

Processing then moves to block 506, where content may then be published onto and/or through the variety of websites, and/or other communication mediums, as described above. In one embodiment, the user providing the content may indicate where the content is to be published. In another embodiment, a website, or communication medium provider, or the like, might determine which content is to be published, where, and/or when. In still another embodiment, an advertisement provider, or other third party content providers, may also influence where, when, and/or how the user's content might be published.

Moving to block 508, logging tools are employed to monitor metrics useable in determining if and/or when to provide compensation to a content provider and/or website owner. Such determination, as noted above, may be based on a variety of metrics, including, but not limited to clicks, mouse overs, feedback regarding the content, website, or the like.

Process 500 then flows to block 510, where compensation may be provided to the content provider of block 502. As noted above, the compensation may be provided based on exceeding a threshold value, exceeding a time period, or any of a variety of other defined criteria. While the above discussions may indicate that compensation may be provided in terms of a financial compensation, the invention is not so limited. For example, compensation may also be provided as discounts in other products and/or services.

Moreover, in one embodiment, where a content provider has obtained a reputation for quality contributions of content, the content provider may also receive compensation in terms of being able to influence which advertisements might be associated with their published content, where the content is published, or the like. Thus, compensation may be reflected to the content provider in a plurality of different ways, without departing from the scope of the invention. In any event, process 500 then may return to perform other actions. For example, in one embodiment, process 500 may be repeated each time a user selects to provide more content, modify existing content, or the like. Moreover, process 500 may be performed per content provider, or collectively for a plurality for content providers.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrative User Interfaces and Site Mapping

The operation of certain aspects of the invention will now be described with respect to various embodiments of user interfaces to the UPS and UCS. FIG. 6 shows an overview diagram of one embodiment of a process site map for the user publishing platform. It should be noted that the UPS may be employed by different brands, trade names, users, or the like. Thus, a plurality of different users may simultaneously and distinctly employ the UPS in a variety of ways. For example, one user may employ the UPS for branding, providing a website with category pages, subcategory pages, and even sub-subcategory pages. In another embodiment, different websites and/or other communication mediums may be used. In one embodiment, arrangements of websites, or other communication mediums may be based on a third party's linking agreement, or the like, including agreements based on logo displays, link references, or the like. In several embodiments, a user may be provided a website based on tab interfaces, page templates, or the like.

Figure 6:
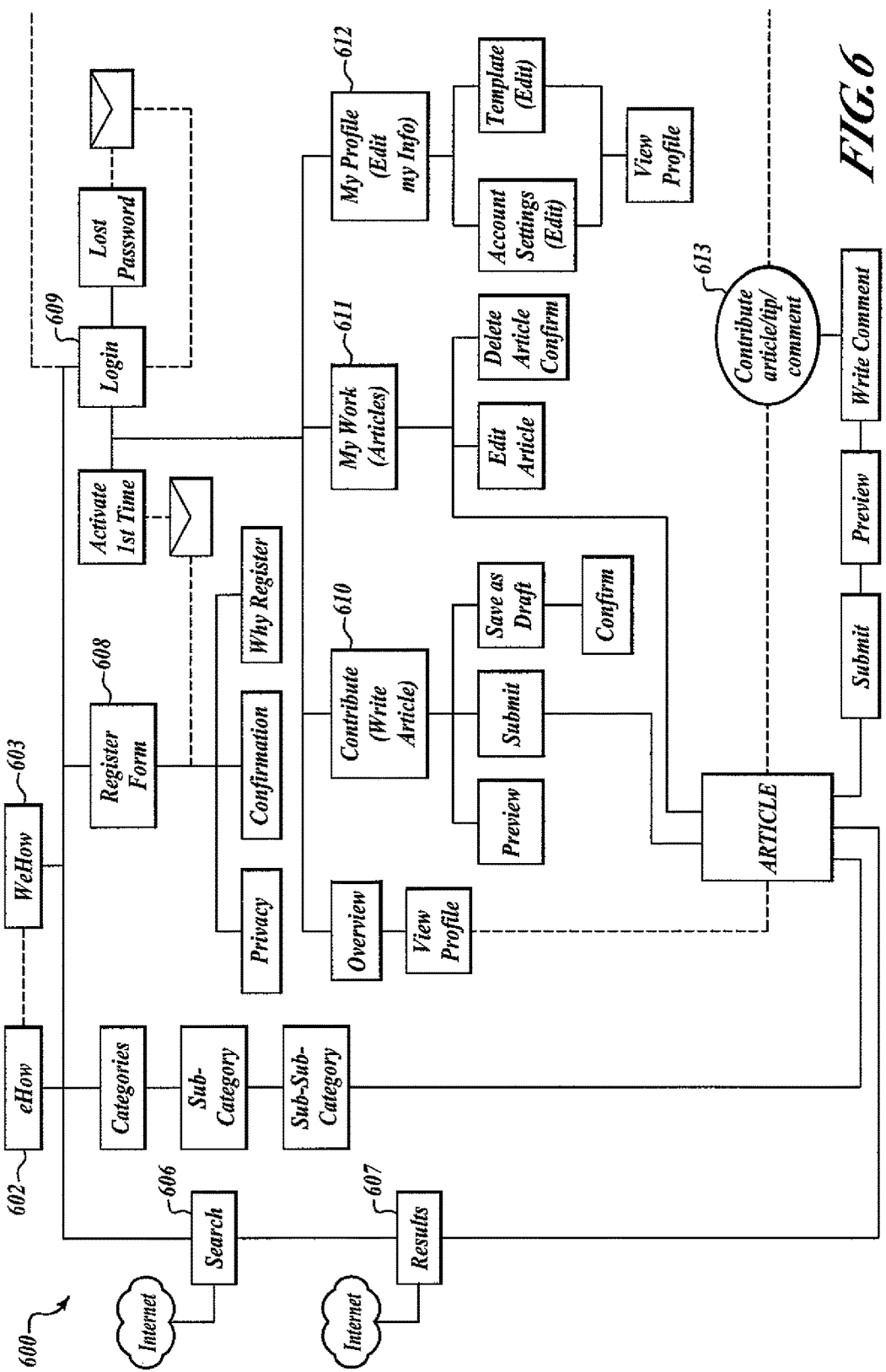
FIG. 6 shows an overview diagram of one embodiment of a process site map of user interfaces for the user publishing platform.

In any event, FIG. 6 provides an overview of various interfaces, and process actions that a user may employ while creating and/or publishing content. Site map 600 of FIG. 6 shows an example of two linking websites 602-603 useable for accessing, creating, and/or otherwise managing content for publication. As noted, more or less websites, as well as a variety of other communication mediums may also be employed.

As shown, site map 600 identifies a variety of possible actions, including performing searches 606, obtaining search results 607, performing registration 608, performing logins 609, contributing/writing content (e.g., an article) 610, modifying content 611, managing a user's profile 612, as well as contributing tips, articles, and/or comments on various other content 613. Many of these actions are described below in conjunction with FIGS. 7-31.

FIG. 7-31 show different screen shots of various embodiments of user interfaces for employing the user publishing system and/or the user compensation system, in accordance with the invention. It should be noted that the following illustrations are not intended to limit the invention. Instead, they are intended to merely provide an overview non-exhaustive understanding of how the invention may be employed.

In one embodiment, a user may interact with the UPS and/or UCS using virtually any browser application, including, but not limited to Internet Explorer (IE), Firefox, Opera, Safari, or the like. Moreover, as described above in conjunction with FIGS. 1-2, the user may use any of a variety of client devices.

As mentioned in conjunction with site map 600 of FIG. 6, a user may initially register for use of the UPS. In one embodiment, one username/password can be provided to a user to allow access to all website properties of the UPS. In one embodiment, username and email addresses can be used as unique identifiers for each registration. Moreover, a user may perform multiple concurrent logins to the UPS.

As websites are acquired, the usernames/passwords of their customers/users can be imported into the UPS registration database as soon as it's appropriate to do so. In one embodiment, a customer messaging may take place before doing this. In one embodiment, self-registration in a defined website can be defined for "I" and "C" contributors. In another embodiment, "P" contributors, editors, and administrators could continue to be registered via an Administrator Tool. In one embodiment, however, to contribute content of any kind (article, tip or comment), a user may first self-register.

Typically, all users can be set up for "I" and "C" publishing with no pre-publication editorial review by default. Users can later be set up for "P" publishing with pre-publication editorial review. Users can also be set up after self-registering to become Staff Writers, Editors, or Administrators.

One embodiment of a screen shot of a login window 700 is illustrated in FIG. 7. In one embodiment, a root level webpage for websites 602-603 can have a prominent button or link called "Log in or Register." This link can be pervasive through all screens on the websites. Clicking on this button can generate the login screen, which can have a link or button to "Create a New Account". Clicking on this button, in one embodiment, produces the Registration Page. In one embodiment, if a user has not logged in and they attempt to contribute content (for example, by clicking on "Write Your Own Article" or "Comment on This Article" or the like.), the Login Page can appear. Logout links may take place of "Login" links after the user has successfully logged in. After clicking on logout, the user may be taken to the one of the website's Home Page. In one embodiment, the user's browser can prompt the user whether it wants to remember the username/password for the next visit.

FIG. 8 illustrates one embodiment of a screen shot of a registration interface 800. If a required field is left empty in the registration interface, or if the password fields do not match, the fields that are to be fixed may be indicated in some manner, e.g., red text, entry area highlighted, or the like. Users may choose to view the Terms of Use and Privacy Policy before proceeding, in one embodiment. If the user clicks on either of these links, a new daughter window can appear with a "Close" button at the bottom of the text. Moreover, users can be told that their registration request failed if the birth date that they enter makes them less than some defined age, after they click on "Continue."

FIG. 9 illustrates one embodiment of an interface useable for managing user registration. Thus, in one embodiment, after clicking on "Continue" on a previous page, an email is sent to the user's registered email account. Screen 900 may then be displayed in the browser. All fields shown in screen 900 may be optional. Clicking "Save" at bottom of a form generates an alert message interposed on the "Home Screen" for the site, telling the user to check their email for the confirmation message so they can log in.

If the user is not logged in after launching the confirmation page, then their first login can take place on their first attempt to contribute content, whether it is a new article or an update to their profile. Moreover, the UPS provides for situations, where the user may have forgotten their password. Thus, a "Forgot Password?" link can appear next to the password entry field for login. Clicking on this link can produce a field requesting username OR email address they registered with and a submit button. Providing registered email address and clicking on "Submit" can cause the user's password to be sent to their registered email account.

Typically, collection of statistics begins for the registered user immediately upon completion of registration. All ratings, comments, article submissions, or the like, may be traceable/displayable back to the user, as well as all revenue-generating activity related to the user (pageviews, click-throughs, or the like). In one embodiment, a mechanism for bulk importing a set of user registrations from an acquired company may be provided. The process can flag duplicate usernames and can allow for the acquired user to change their username to something unique to preserve their account history. Moreover, in one embodiment, logging subsystems of the UPS may track abandoned registrations.

FIGS. 10, 10A and 10B illustrate (FIG. 10 illustrates a relationship between FIGS. 10A and 10B) one embodiment of a screen 1000 configured as a possible home screen to a publishing website managed by the UPS. Screen 10000 enables users to obtain an at-a-glance view into the parts of their presence on the site; and obtain a convenient means of editing this info. FIG. 11 provides one embodiment of a screen 1100 for use in managing content by the user. Clicking on "View" takes the user to the published article. Clicking on "Preview" opens the article in Preview mode. Clicking on "Edit" opens the article in the Article Submission Form.

Clicking on "Delete" can prompt the user whether they are sure they want to delete an article, since deletion can remove the article from the site and they won't be able to earn any more money from it. In one embodiment, however, a licensing arrangement with a content contributor can enable the UPS to still keep a deleted article in a database for subsequent reposting on another website, or even one the same website at a different time. In one embodiment, the user may have two choices including "OK" and "Cancel;" choosing "OK" can remove the article from the website (however, potentially not the database) and return the user to the Manage Articles screen. Choosing "Cancel" returns the user to the Manage Articles screen. Deleted articles are no longer factored into ratings calculations. In one embodiment, "Draft" status indicates a pre-publication version of the article saved by user. In one embodiment, a third status may exist for "Removed" articles, however those might not be displayed to the user. An example of a "Removed" article is "How to Build a Dirty Bomb". For example, editing might not be able to fix this article, and it might need to be removed for subject matter alone. "Removed" articles can also be kept in a database for later use.

In one embodiment, the user may also be provided with a screen that includes comments that other users have made against this particular user's articles. Clicking on username link takes the user to username's Profile page ($3^{rd}$ person view). Clicking on the article title link takes user to published article page. Clicking on "View" takes user to full text of a comment on the published article page.

FIGS. 12-13 illustrate embodiments of screens 1200 and 1300 useable to manage/view the user's profile. Prior to publication, a process can be applied to the Location and About Me fields to scan for HTML and/or offensive content. If the profile includes HTML, or offensive language/content, an alerts message can appear to the user after they click on "Save My Profile" telling them to check for at least one of these two conditions and resubmit after editing. Note that all uploaded images can be reviewed via a Picture Queue. Uploaded images can be published to the public site immediately with the finished profile, but if an image fails review, a generic placeholder image can be substituted on this page and the user's public profile page. The user can subsequently upload another image that meets the UPS standards (published in a FAQ). An email can also be sent informing the user that this action took place against their submitted image.

A facility may be provided to a user to remove their profile from the system. When the user selects this option from their Profile Page, the following actions can take place: they are shown a confirmation alert that they click-through; if they click no, they are returned to the Profile Settings page; if they click yes, their profile is taken down off the public site, all articles and comments attributed to them can also subsequently revert to "site Friend;" account information and article/comment attribution can still be stored in the database, but may only be displayable on the user's Control Panel; User can still login using their credentials and make their profile and attributions "public" again at any time. In one embodiment, user earnings from their articles can continue uninterrupted regardless of whether their profile is public or not.

Article Submission may be performed using several interfaces described next. FIGS. 14, 14A, and 14B (FIG. 14 illustrates a relationship between FIGS. 14A and 14B) one embodiment of a screen 1400 for managing publication of an article. As noted, above, The UPS can initially be used to compose, edit, and publish "I" content across all website products. However, other embodiments can enable "P" and "C" content to use UPS as well. The UPS can support a relatively infinite number of content submission forms across a wide variety of website properties. For example, a first website could have three forms; a second website could have two forms, or the like.

As shown in FIG. 14, buttons available at the bottom of Article Submission Form include: "Save and Preview," "Save for Later" and "Publish." Clicking on "Save and Preview" for an article can save it to a draft to "My Work" and open the article in a separate Preview window. Clicking on "Save as Draft" can save a draft to "My Work" and take the user to "My Work". "Publish" can be dimmed until the required fields are filled out. "Save and Preview" buttons interspersed at roughly "fold" intervals can have substantially the same function as described above. Clicking on "Save and Preview" anywhere on the form can toggle the user to Preview mode. Navigating away from the form without saving it by clicking on another tab can generate an alerts window that all data may be lost, sure you want to continue? If the answer is yes, they can be returned to their Overview. In one embodiment, a popup Javascript confirmation box is provided that includes an "OK" button to discard changes, and a "Cancel" button to stay on form. In one embodiment, an iterative formula can be employed to extract keywords out of an article's title for generating a URL to the article. Moreover, a link can be included with the "Contact Us" form so that end users/writers/editors can use it to communicate system issues to the UPS operator.

Figures 15, 15A, 15B, 15C:
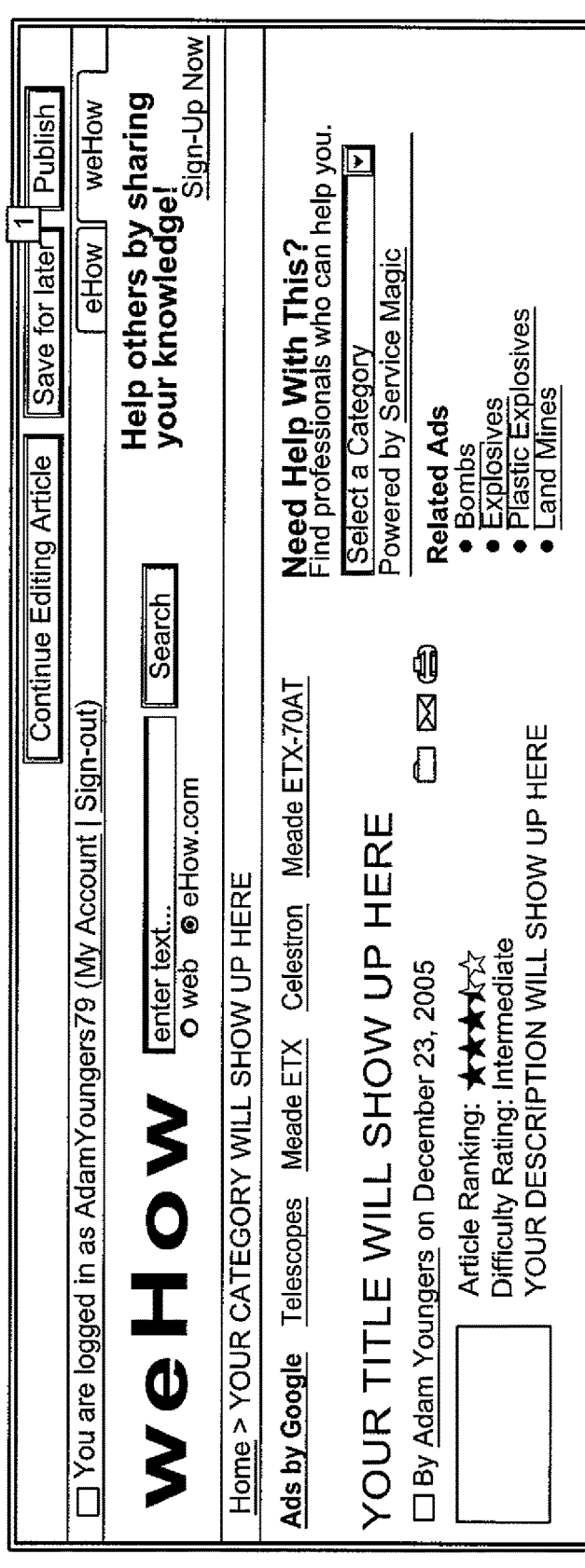

FIGS. 15, and 15A-15C (FIG. 15 illustrates a relationship between FIGS. 15A-15C) provide one embodiment of screen 1500 for use in previewing a page. Prior to publication, a process can be applied to full article text to scan for HTML and offensive content. If the profile contains HTML, or offensive language/content, an alerts message can appear to the user after they click on "Publish" telling them to check for these two conditions and resubmit after editing. Uploaded images can be reviewed via the Picture Queue. Uploaded images can be published to the public site immediately with the finished article, but if images fail review, a generic placeholder image can be substituted on the published article page. The user can subsequently upload an image that meets UPS standards (published in a FAQ). An email can also be sent informing the user that this action took place against their submitted image. FIGS. 16 and 16A-C (FIG. 16 illustrates a relationship between FIGS. 16A-16C) provide one embodiment of screen 1600 illustrating how an article might appear when published.

In addition, a variety of interface tools may be provide by the UPS for site management. Thus, Published articles ("I" and "C" content) can have a button prominently displayed for flagging the article as objectionable or miscategorized (though users may not be able to specify why they are flagging). If a given article accrues some defined number of clicks (such as 2-3) from different IPs in the user community, it stays live on the site but is placed into the Article Queue for review. Article status on user's Control Panel may still indicate "Published" and they may not receive email notification of the flag. Users do not have to be registered or logged in to flag an article as objectionable, or to rate an article or comment.

Comments submitted to an article may have post-processing applied to the text to scan for HTML and offensive content. If the comment contains HTML, or offensive language/content, an alerts message may appear to the user after they click on "Publish" telling them to check for these two conditions and resubmit after editing. Comments (for "P", "I" and "C" content) can have a button prominently displayed for flagging the comment as objectionable. If a given Comment accrues another defined number of clicks (such as one) from the user community, it remains on the site but is placed into the Comments Queue for processing.

Articles and comments may be rateable from the article page. In one embodiment, one rating per article per IP address could be allowed (user can rate both article and comments). The User rating could be based on the average of the ratings other users have placed on that user's articles, minimum three articles published (with 1 rating collected for each) for a User rating to be present. Until then, User rating may be dimmed with marketing copy explaining how to build your rating. Ratings on comments to writer's articles may not be factored in. Ratings interface may be as the wireframes shown above. However, other numbers of ratings may also be allowed, without departing from the scope of the invention.

Figure 18:
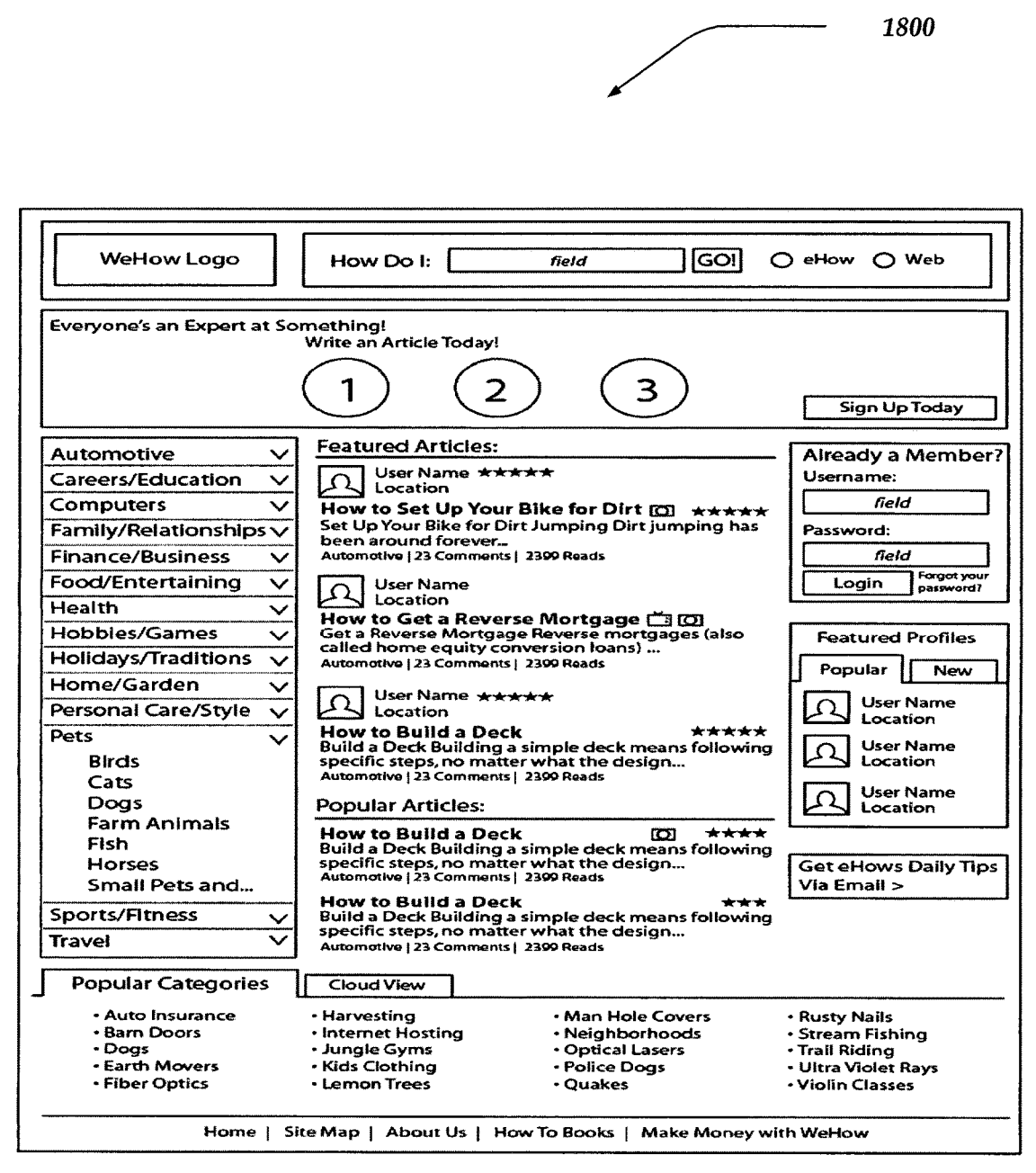

In addition, new home pages for a website may be developed, for example, to stress new features of a user article creation and profiling. FIG. 17 therefore illustrates one embodiment of screen 1700 useable to promote a brand and the idea of getting paid for content submissions. In one embodiment, website home pages can be substantially similar, such as illustrated in FIG. 18's screen 1800.

In one embodiment, website pages may be organized based on category, subcategory, and even sub-subcategory pages. In one embodiment, a new page may be developed to free up subcategory pages of, for example, long lists of articles. By employing categories and the like, a new opportunity may arise for additional ad units and highly targeted Search Engine Optimizations.

A plurality of interfaces may also be provided to access and manage compensation. At least some of the interfaces may be managed through the UCS. For example, in one embodiment, Upon a first visit to "My Earnings" tab, a user may be greeted with introductory copy with FAQ links (explaining how they earn money for writing articles, how often they get paid, what they can do to increase their earnings, or the like). The intro may be a multi-page, wizard-like experience, or may be a single page. At the end of the intro, the user is presented with a "Let's Get Started!" button. Clicking this button leads them into Setup. One embodiment of a screen 1900 useable for payout setup is illustrated in FIG. 1900. After completion of the Intro, the user may see a setup screen with two sections—one for 1099 tax form, the other for Paypal, or the like. In one embodiment, information communicated over the network during at least these interfaces may be encrypted. Moreover, the data obtained may also be encrypted.

FIG. 20 illustrates one embodiment of a screen 2000 useable by the user in managing their payout statements. For example, as shown, the user may see data displayed under an "earnings" tab. Payments may include a variety of states, including: completed—where the payment may have been deposited in a user's account in an amount stated in the 'payment issued' column; 'no payment issued' indicating that the user did not accrue minimum amount for payment over period and accrued earnings will roll over to next period; payment failed may indicate that the payment fails to process (e.g. for invalid account information or the like) or other technical reasons. Earnings may roll over to next period. Status may also include Payment pending indicating that payment that is in the process of being issued to user's account; and Period active to indicate that the earnings that have accrued to date over the current period. In one embodiment, the earnings summary may maintain metrics at an individual user level, and/or display any number of earnings for an entire community. FIG. 21 illustrates that by clicking on any month in the period column an interface such as screen 2100 may be displayed. In one embodiment, all articles that were published within the selected period may be displayed in a list, along with whatever earnings they accrued over that period. In one embodiment, user-deleted articles may display up to the period in which they were deleted. Similarly, clicking on the "by Article" submenu may produce a screen listing all articles a user has ever published (user-deleted articles not included), with lifetime earnings to date for each article displayed. If the user wishes to revise their payment settings at any time, they can do so by clicking on a submenu, such as illustrated as one embodiment in FIG. 22 as screen 2200.

The user is further provided a variety of screen interfaces through the UPS for managing their content. That is users may elect at any time to remove (delete) articles that they have written from the site using their Control Panel. In the event that a user makes this choice, and the article they delete has earned some (any) revenue and/or other compensation in the past, the following steps can take place: a) an alert message may be displayed to the user, telling them that making this choice will discontinue their earnings for this article, but the article may stay live on the site per Terms of Use, albeit under anonymous attribution; b) if the user accepts this message and chooses to continue, the article can be stripped of their handle and subsequently attributed to a particular site. The database may "remember" the original author, however; c) an email message can be sent to the user confirming what has happened, and telling them what to do in case they want to restore their attribution on the article; and d) if the user chooses to Cancel at the onscreen message alert, no action may be taken and they will be returned to their Control Panel.

A variety of editor control interfaces may also be provided to manage user registrations, permissions, and the like to the UPS and/or UCS. In one embodiment, the interfaces can be obtained at each website managed by UPS, say from a user's control panel. These administrative tools may be implemented such a way as to ensure that changes can be managed centrally and fed out to "subscriber" websites, rather than effecting changes at each of those websites individually. Users with appropriate permissions can see the Admin Tool tab(s) on their Control Panel after logging into a site.

FIG. 23 illustrates one embodiment of a screen 2300 for managing article queues. If a user has clicked on an article to edit it from a search results list, the "Contribute" tab toggles to "Edit Article" and displays the legacy article submission form, modified to be compatible with both past and current forms. A button may be provided for users in Edit Article mode that now want to contribute an article. A "Remove Article" button may be available to remove the article. Articles may be removed for objectionable subject matter, where no amount of editing can rescue it. After an article is removed, it is no longer viewable on the site, even from the user's "Manage Articles" page. Following removal of an article, an email alert may be sent to the user informing them of the action and reminding them of the Terms of Use. Also available may be a "Restore Article" button for those users that chose to delete their article (and remove their attribution to it), but have later changed their mind and want to restore their handle and their earnings.

Earnings, in one embodiment, may not be retroactive for any articles that users deleted and later chose to restore to their account. In other words, for the period of time the article was attributed to an anonymous writer, all proceeds can go to the operator of the UPS.

Additionally, a "Seasonal" flag may be available for articles that are to be reviewed periodically. The flag includes a date for the next scheduled review of the content. When that date is reached, the article is sent to the Editorial Queue for processing. The date may be reset or removed at that time by an Editor.

Figure 24:
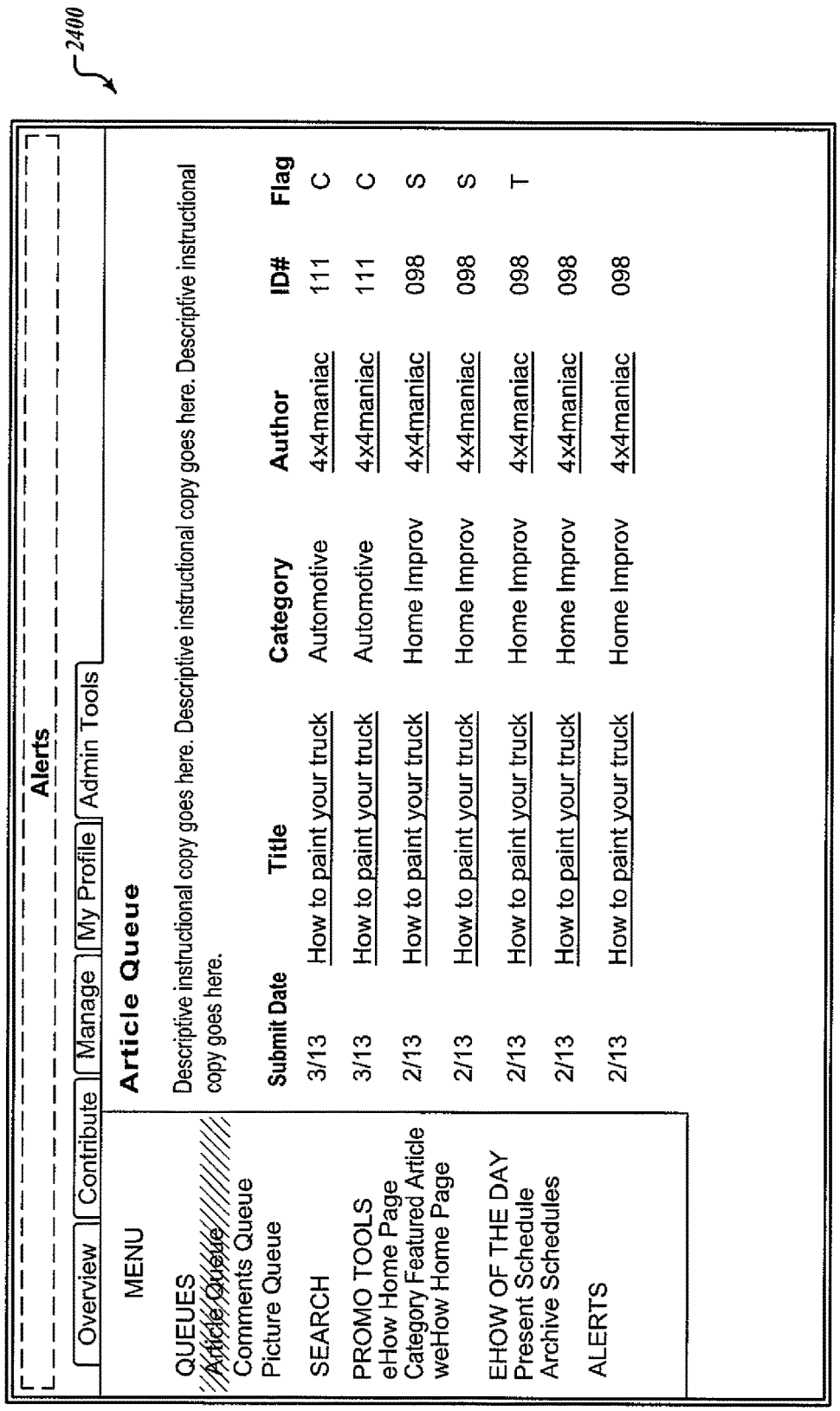

Shown in FIG. 24 is one embodiment, of screen 2400 of an article queue.

"P" articles can continue to be sent through the Article Queue for approval. After clicking on the Queue to open its contents, the user may see articles in the queue in the following columns: Submit Date (sort order), Article ID, Category, Author, Title, and Flag. Author is linked to the Author's profile page; Title is a link to the article itself. When the user clicks on the link, the article opens in the Edit Article Form. Three flags may be defined: "C" for articles flagged by the community as objectionable; "T" for topical articles; and "S" for seasonal articles. Flagged articles can appear in the queue above non-flagged articles. The order of flags can be: C, T, S. Articles that have been flagged by the user community may be sent to the Article Queue for review, but may also stay live on the website and still be displayed with a "Published" status in the author's Control Panel. Moreover, the article may be time stamped with the editor username when published. Submitted articles may be available on the (public) production site in real time, e.g., a short time after the "Publish" button is clicked.

The UPS may also provide a comments queue interface such as the one embodiment of screen 2500 illustrated in FIG. 25. Those comments flagged by the community as objectionable can be sent to the Comments Queue for processing; however they may remain live, in one embodiment, on a website until the review takes place. In the Comments Queue, comments can appear unflagged (all are equal), or flagged (some not equal). The contents of the Comments Queue may be similar to the "eHow Manage User Tips" queue in the Admin tool, with at least one of the following exceptions: (1) display submits date of comment, and (2) sort by submit date, descending order. Users may delete their own comments without sending a flag to editorial staff.

Figure 26:
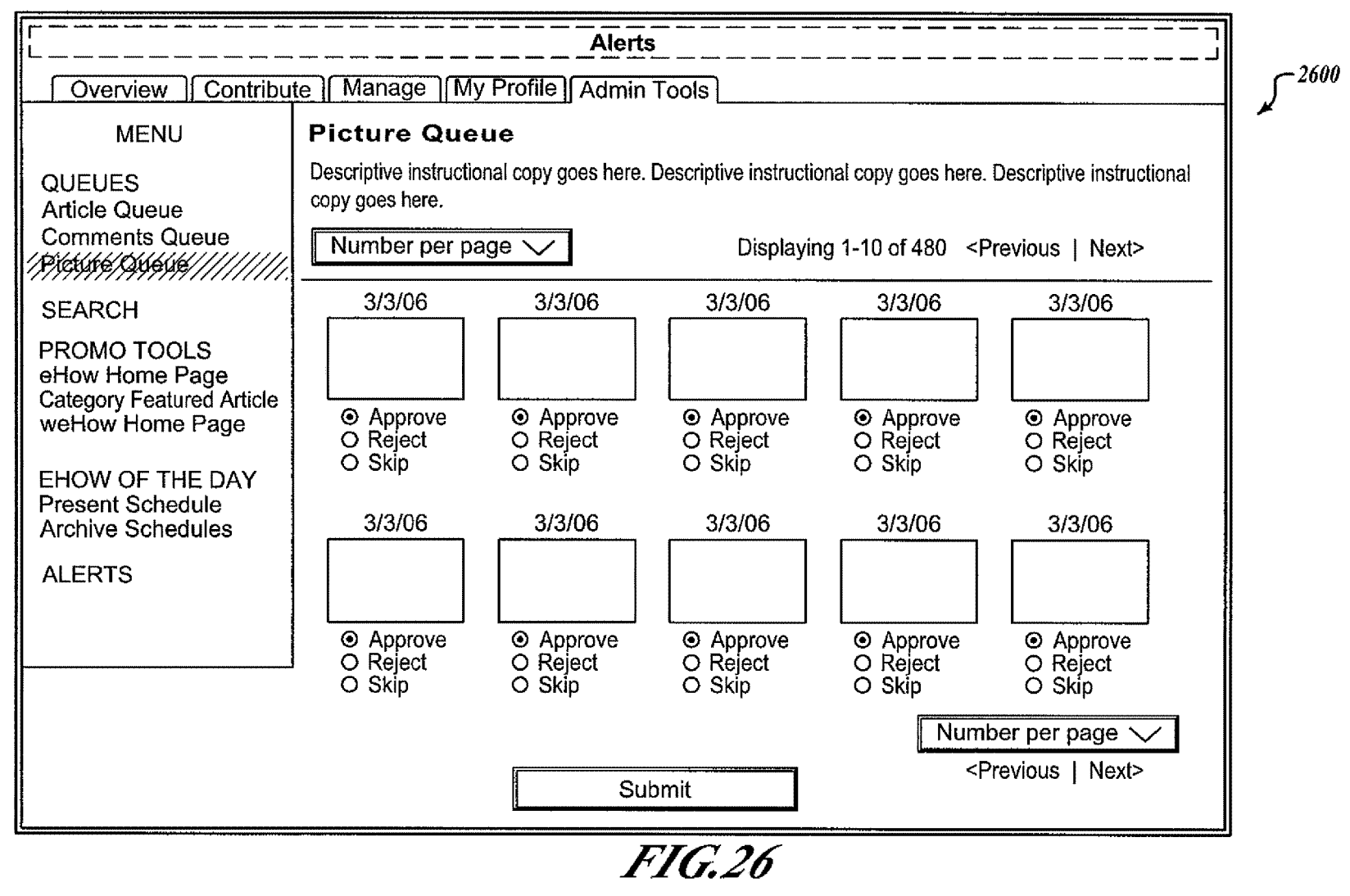

Similarly, an image queue interface may be available, such as screen 2600 of FIG. 26. The Image Queue can be a "lightbox" view of all images submitted for user profiles and articles. Options under each image can be Approve or Reject (Approve selected by default). Selecting Approve can leave the published page as is, with the actual uploaded image (either Profile or Article). Clicking on Reject sends a message to the user at their registered address by informing them that their image was rejected, and that their profile or article is still published, but without the offending image. Clicking on Skip will save the image in the queue and no action is taken on the image.

Figure 27:
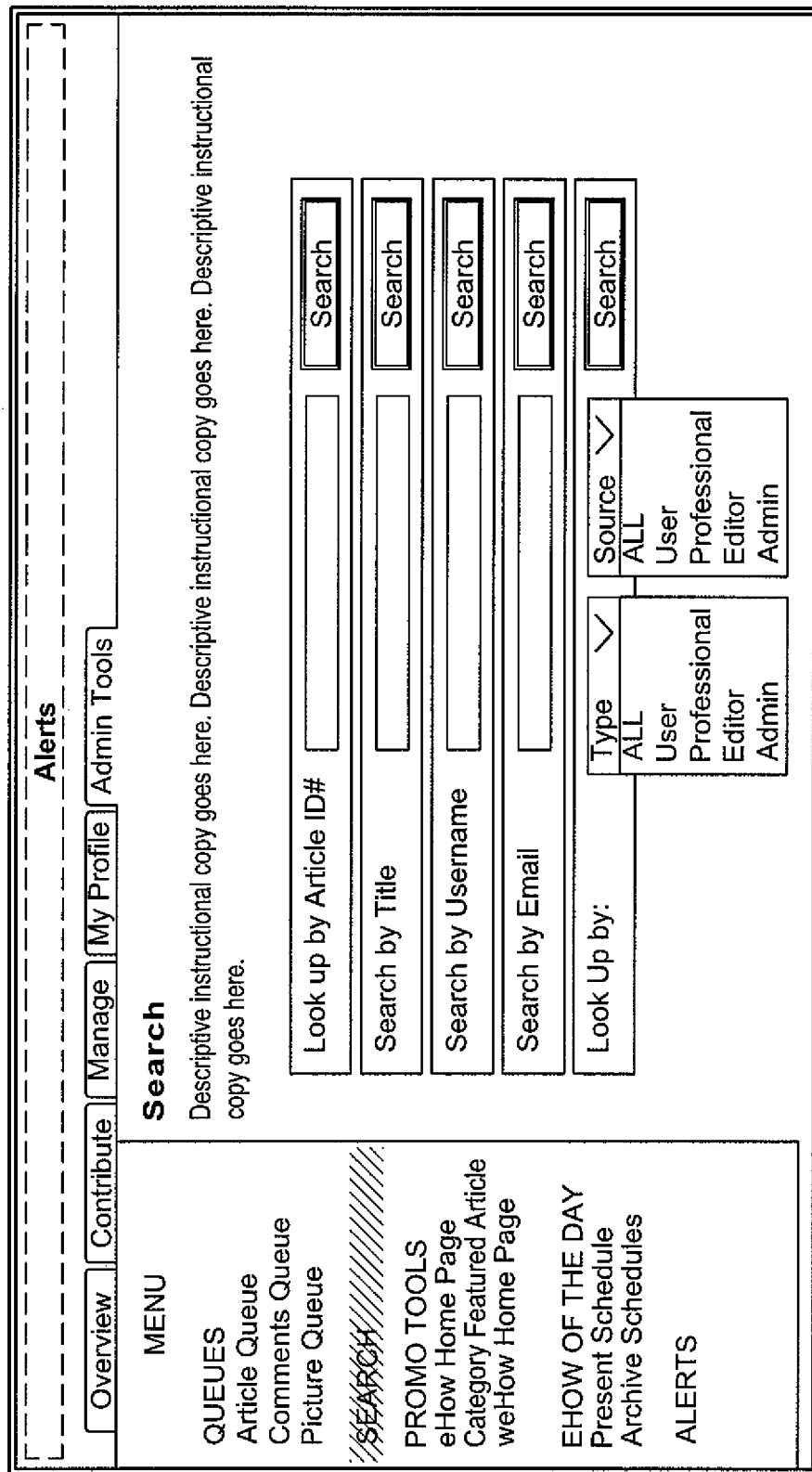

Writers, editors, and other uses may employ a search interface; one embodiment of screen 2700 is illustrated in FIG. 27 as an example. Writers and Editors are able to search for articles by Article ID or title. Searches can also allow wildcards. User can click-through entry on search results list, article can then appear under "Edit Article" tab (dynamically renamed from "Add Article") opening up with data in legacy article submission form. In at least one embodiment, Search results layout can look somewhat similar to Article Queue. Moreover, administrators, or the like, are able to search for users by username, or by email address (either of these can allow wildcard searches), or by some combination of Type (user, professional, editor or admin) and Source (Demand Media, AC, Argawal, or the like), as defined by drop downs, or the like.

Figure 28:
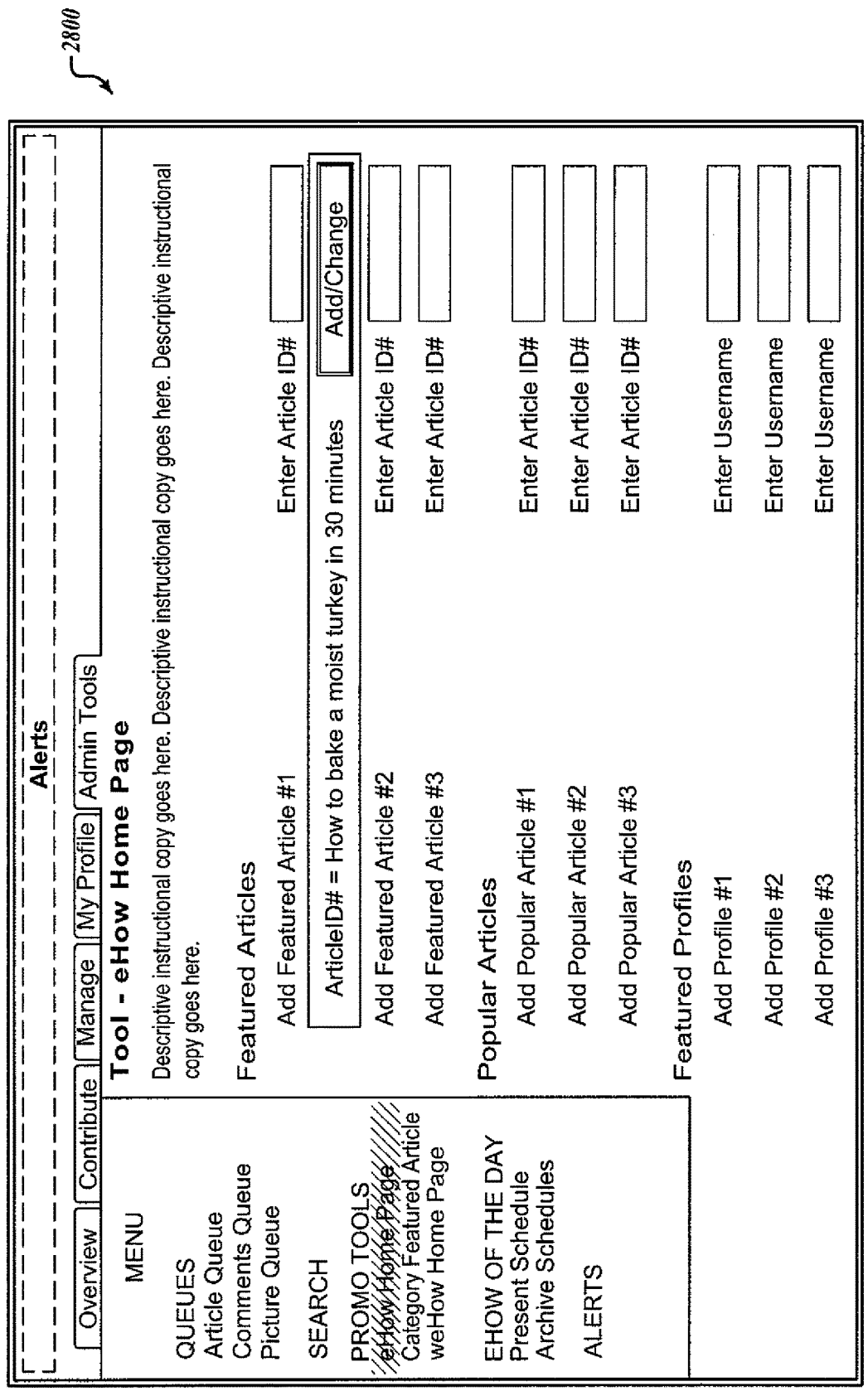
Figure 29:
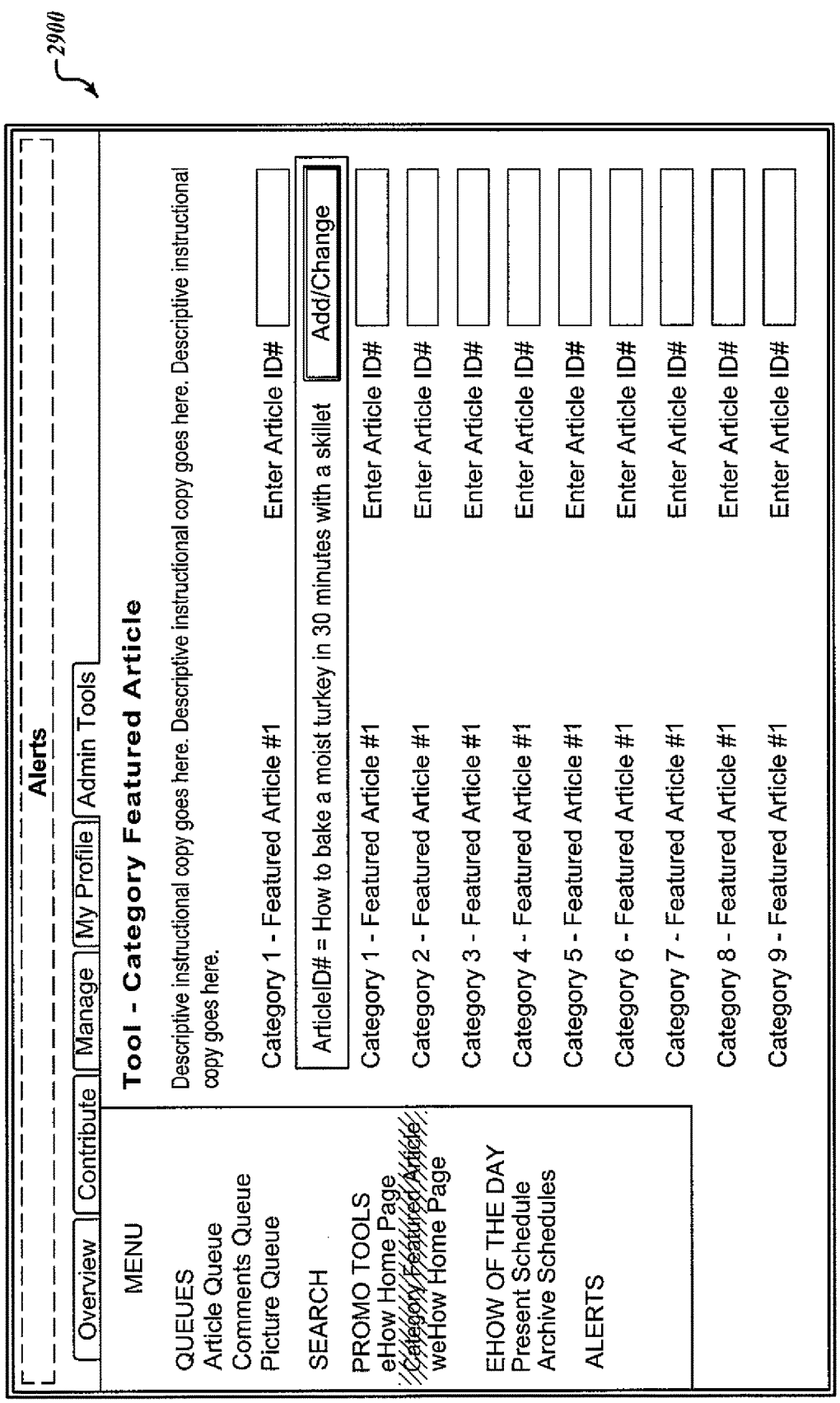
Figure 31:
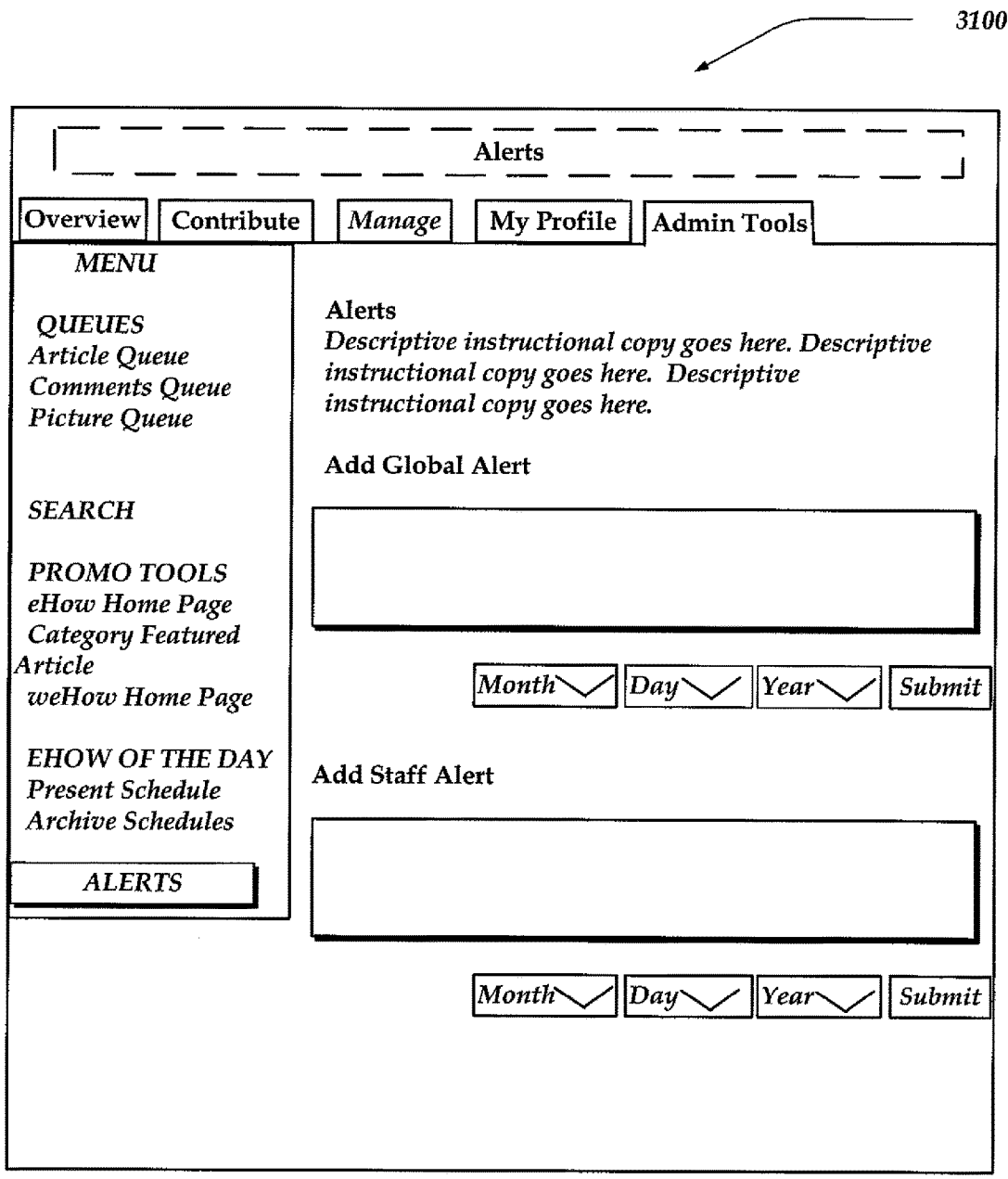

Several other interfaces may be provided to enable management of various home page promotions, various embodiments of which are illustrated in FIGS. 28-30. In one embodiment, screen 3100 of FIG. 31 may be employed to manage alerts. That is, a mechanism can be provided for the Admin to broadcast system wide, e.g., users and staff, or targeted, e.g., staff, alert messages. When text is typed into Alerts interface, it will immediately publish to user Overview pages and Admin Tool home. If no text is typed in, no alert will appear.

The above specification, examples, example interface screens, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system, comprising:
    a processor; and
    a tangible storage medium storing thereon program logic for execution by the processor, the program logic comprising:
        publishing logic executed by the processor for a publishing platform that performs actions, including:
            ranking a content provider based on ratings received, via an automated feedback system, from users regarding contributions of content of the content provider, the ratings comprising ranking of an article provided by the content provider and the ratings being variable for each respective user, wherein the users are different from the content provider;
            receiving, from the content provider, content in a first format and layout;
            automatically reformatting the received content into a second different format and layout;
            selecting at least one advertisement from a third-party advertisement provider, where the selection of the at least one advertisement is based on the ranking of the content provider;
            selecting a website for publication of the reformatted content, where the selection of the website is influenced by the third-party advertisement provider;
            publishing the reformatted content onto at least one webpage of a website, the at least one webpage comprising the reformatted content and the at least one advertisement;
            automatically reformatting the received content into a third format and layout associated with a different communication medium other than web pages; and
            publishing the reformatted content using the third format and layout through the different communication medium; and
        compensation logic executed by the processor for a compensation platform that is configured to perform actions, including:
            determining compensation to the content provider based on the publication of the content, based on a plurality of factors, comprising at least one of frequency of views, popularity of content among other users, or advertisement related clicks;
            inhibiting at least some compensation based on a detected fraudulent click activity; and
            providing the compensation to the content provider.

2. The system of claim 1, wherein the determining compensation is further determined based on at least one of the following: a number of advertisements displayed on a web page with the published content, a pay per click (PPC) for advertisements on the web page, cost per thousand (CPM), cost per lead (CPL), cost per action for an advertisement (CPA), or a mouse over of an advertisement within the web page.

3. The system of claim 1, wherein the publishing platform further comprises a traffic logger that is configured to track an activity associated with a viewing of the website by a viewer.

4. The system of claim 1, wherein the publishing platform further provides the content provider a plurality of user interfaces useable for editing and publishing the content.

5. The system of claim 1, wherein the inhibiting at least some compensation further comprises:
    determining an acceptable range of advertisement related clicks on the website for a viewer of the website;
    if advertisement related clicks for the viewer are detected to be within the acceptable range, counting the clicks in determining compensation to the content provider; and
    if the advertisement related clicks for the viewer are detected to exceed the acceptable range, inhibiting the clicks from being used in determining compensation to the content provider.

6. The system of claim 5, wherein if the advertisement related clicks for the viewer are detected to exceed the acceptable range, the inhibiting at least some compensation further comprises:
    determining a network address associated with the viewer; and
    if the viewer is determined to be the content provider, based on the network address, determining whether to exclude the content provider from additional compensation.

7. The system of claim 1, wherein the publishing platform performs actions, further including:
    automatically analyzing the received content to identify potentially offensive content; and
    if potentially offensive content is identified, inhibiting the potentially offensive content from being published.

8. A tangible non-transitory computer-readable storage medium storing thereon computer-readable instructions to cause a system to:
    rank a content provider based on ratings received, via an automated feedback system, from users regarding contributions of content of the content provider, the ratings comprising ranking of an article provided by the content provider and the ratings being variable for each respective user, wherein the users are different from the content provider;
    receive, from the content provider, content in a first format and layout;
    automatically reformat the received content into a second different format and layout;
    select, by at least one computing device, at least one advertisement from a third-party advertisement provider, where the selection of the at least one advertisement is based on the ranking of the content provider;
    select a website for publication of the reformatted content, where the selection of the website is influenced by the third-party advertisement provider;
    publish the reformatted content onto at least one webpage of a website, the at least one webpage comprising the reformatted content and the at least one advertisement;
    determine compensation to the content provider based on the publication of the content, based on a plurality of factors, comprising at least one of frequency of views, popularity of content among other users, or advertisement related clicks;

inhibit at least some compensation based on a detected fraudulent click activity; and provide the compensation to the content provider.

9. The computer-readable storage medium of claim 8, wherein the computer-readable instructions further cause the system to:

determine an acceptable range of advertisement related clicks for a viewer of the at least one web page;

if advertisement related clicks for the viewer are detected to be within the acceptable range, count the clicks in determining compensation to the content provider; and if the advertisement related clicks for the viewer are detected to exceed the acceptable range, inhibit the clicks from being used in determining compensation to the content provider.

10. The computer-readable storage medium of claim 8, wherein the compensation is further determined in part based on another activity by a viewer, and wherein the other activity includes providing a positive comment on the content.

11. A method, comprising:

ranking a content provider based on ratings received, via an automated feedback system, from users regarding contributions of content of the content provider, the ratings comprising ranking of an article provided by the content provider and the ratings being variable for each respective user, wherein the users are different from the content provider;

receiving from the content provider, using at least one computing device, content in a first format and layout;

automatically reformatting, using the at least one computing device, the received content into a second different format and layout;

selecting, using the at least one computing device, at least one advertisement from a third-party advertisement provider, where the selection of the at least one advertisement is based on the ranking of the content provider;

selecting, using the at least one computing device, a website for publication of the reformatted content, where the selection of the website is influenced by the third-party advertisement provider;

publishing the reformatted content onto at least one webpage of a website, the at least one webpage comprising the reformatted content and the at least one advertisement;

determining compensation to the content provider based on the publication of the content, based on a plurality of factors, comprising at least one of frequency of views, popularity of content among other users, or advertisement related clicks; and providing the compensation to the content provider.

12. The method of claim 11, wherein the determining compensation is further determined based on at least one of the following: a number of advertisements displayed on a web page with the published content, a pay per click (PPC) for advertisements on the web page, cost per thousand (CPM), cost per lead (CPL), cost per action for an advertisement (CPA), or a mouse over of an advertisement within the web page.

13. The method of claim 11, further comprising:

tracking an activity associated with a viewing of the website by a viewer.

14. The method of claim 11, further comprising:

inhibiting at least some compensation based on a detected fraudulent click activity.

15. The method of claim 11, wherein the providing the compensation further comprises:

determining an acceptable range of advertisement related clicks for a viewer of the at least one web page;

if advertisement related clicks for the viewer are detected to be within the acceptable range, counting the clicks in determining compensation to the content provider; and if the advertisement related clicks for the viewer are detected to exceed the acceptable range, inhibiting the clicks from being used in determining compensation to the content provider.

16. The method of claim 15, further comprising if the advertisement related clicks for the viewer are detected to exceed the acceptable range:

determining a network address associated with the viewer; and if the viewer is determined to be the content provider, based on the network address, determining whether to exclude the content provider from additional compensation.

17. The method of claim 11, wherein the compensation is further determined in part based on activity by a viewer, wherein the activity includes providing a positive comment on the content.

18. The method of claim 11, further comprising:

automatically analyzing, using the at least one computing device, the received content to identify potentially offensive content; and if potentially offensive content is identified, inhibiting, using the at least one computing device, the potentially offensive content from being published.

19. The method of claim 11, further comprising:

receiving a request from the content provider to delete previously-provided content; and updating the ranking so that the previously-provided content is not factored into calculations of the updated ranking.

20. The method of claim 11, wherein the ranking is further based on an average of the ratings regarding the contributions of content of the content provider.

* * * * *